US011872579B1

(12) United States Patent
Hegeman

(10) Patent No.: US 11,872,579 B1
(45) Date of Patent: Jan. 16, 2024

(54) MODULAR PAINT SPRAYING SYSTEM

(71) Applicant: Foreman Technologies Inc., Hendersonville, TN (US)

(72) Inventor: Nicholas William Hegeman, Hendersonville, TN (US)

(73) Assignee: Foreman Technologies Inc., Hendersonville, TN (US)

( * ) Notice: Subject to any disclaimer, the term of this patent is extended or adjusted under 35 U.S.C. 154(b) by 0 days.

(21) Appl. No.: 17/462,852

(22) Filed: Aug. 31, 2021

Related U.S. Application Data

(63) Continuation of application No. 16/721,144, filed on Dec. 19, 2019, now Pat. No. 11,110,475.

(60) Provisional application No. 62/782,304, filed on Dec. 19, 2018.

(51) Int. Cl.

| | |
|---|---|
| ***B05B 13/04*** | (2006.01) |
| ***B05B 12/12*** | (2006.01) |
| ***B05C 1/00*** | (2006.01) |
| ***B05B 13/00*** | (2006.01) |
| ***B05B 9/00*** | (2006.01) |

(52) U.S. Cl.
CPC .......... *B05B 13/0431* (2013.01); *B05B 9/007* (2013.01); *B05B 12/124* (2013.01); *B05B 13/005* (2013.01); *B05C 1/00* (2013.01)

(58) Field of Classification Search
None
See application file for complete search history.

(56) References Cited

U.S. PATENT DOCUMENTS

| | | | | | |
|---|---|---|---|---|---|
| 3,248,020 | A * | 4/1966 | Spalding | F04B 53/164 | 92/138 |
| 4,358,471 | A * | 11/1982 | Derkacs | F01D 5/288 | 118/712 |
| 4,919,977 | A * | 4/1990 | Yamane | B05B 16/20 | 427/388.1 |
| 5,090,361 | A * | 2/1992 | Ishibashi | B25J 18/005 | 118/313 |
| 5,103,761 | A * | 4/1992 | Ishibashi | B05B 13/0468 | 239/243 |
| 5,240,745 | A * | 8/1993 | Yamamoto | B05B 15/555 | 118/316 |
| 5,368,232 | A * | 11/1994 | Schroeder | E01C 23/222 | 239/150 |
| 5,419,922 | A * | 5/1995 | Bajek | F27D 1/1636 | 427/427 |

(Continued)

*Primary Examiner* — Jethro M. Pence
(74) *Attorney, Agent, or Firm* — Run8 Patent Group, LLC; Peter Miller

(57) ABSTRACT

A paint sprayer array may include an array frame. The array frame may include a first support member. The paint sprayer array may include an array mount. The array mount may include an array support member. The array mount may be detachably mountable to the array frame. The paint sprayer array may include a plurality of sprayers. Each sprayer of the plurality of sprayers may be detachably mountable to the array support member of the array mount and operable to selectively atomize paint. The paint sprayer array may include a sprayer activation assembly. The sprayer activation assembly may be operable to selectively activate at least a portion of the plurality of sprayers. The paint sprayer array may be selectably mountable to an aerial work platform. The aerial work platform may move the paint sprayer array to paint a large work surface.

20 Claims, 30 Drawing Sheets

(56) References Cited

U.S. PATENT DOCUMENTS

| | | | | | |
|---|---|---|---|---|---|
| 5,578,128 | A * | 11/1996 | Schneider | B05C 7/02 | 118/712 |
| 6,036,123 | A * | 3/2000 | West | E04D 15/07 | 239/587.5 |
| 6,071,346 | A * | 6/2000 | Yamauchi | B05B 12/1463 | 118/302 |
| 6,138,671 | A * | 10/2000 | Noakes | A61M 15/0065 | 128/202.25 |
| 6,315,648 | B1 * | 11/2001 | Neer | B24C 3/062 | 451/92 |
| 6,533,861 | B1 * | 3/2003 | Matsuda | B05B 13/0431 | 239/223 |
| 6,557,815 | B1 * | 5/2003 | Klein, II | B05B 7/2405 | 248/609 |
| 6,896,192 | B2 * | 5/2005 | Horan | G01B 11/026 | 239/289 |
| 6,908,048 | B2 * | 6/2005 | Di Gioia | B05B 7/1404 | 239/304 |
| 6,929,698 | B2 * | 8/2005 | Shutic | B05B 7/1454 | 118/712 |
| 7,909,265 | B2 * | 3/2011 | Adams | A01M 21/04 | 222/626 |
| 8,524,312 | B2 * | 9/2013 | Huda | B05B 16/00 | 427/427 |
| 9,095,865 | B2 * | 8/2015 | Ahmed | B05B 16/00 | |
| 9,364,839 | B2 * | 6/2016 | Huda | B05B 7/1272 | |
| 9,919,330 | B2 * | 3/2018 | Letard | B25J 5/02 | |
| 10,124,359 | B2 * | 11/2018 | Raman | B05B 13/005 | |
| 10,183,542 | B1 * | 1/2019 | Bittner | B60G 17/0165 | |
| 11,110,475 | B2 * | 9/2021 | Hegeman | B05B 13/005 | |
| 11,235,344 | B2 * | 2/2022 | Raman | B25J 11/0075 | |
| 2003/0017276 | A1 * | 1/2003 | Yamada | B05B 12/18 | 427/372.2 |
| 2003/0141376 | A1 * | 7/2003 | Horan | G01B 11/026 | 239/1 |
| 2003/0215576 | A1 * | 11/2003 | Garner | B05B 7/2486 | 502/340 |
| 2004/0020535 | A1 * | 2/2004 | Di Gioia | B05B 7/1404 | 137/240 |
| 2008/0047591 | A1 * | 2/2008 | Seitz | B05B 15/555 | 134/22.18 |
| 2008/0048049 | A1 * | 2/2008 | Adams | A01M 7/0035 | 222/626 |
| 2008/0193632 | A1 * | 8/2008 | O'Hara | B01J 2/12 | 118/712 |
| 2009/0007844 | A1 * | 1/2009 | Krogedal | B25J 19/0079 | 118/313 |
| 2009/0050712 | A1 * | 2/2009 | Vitantonio | B05B 9/0861 | 239/332 |
| 2011/0088723 | A1 * | 4/2011 | Jensen | F03D 80/50 | 134/172 |
| 2011/0212254 | A1 * | 9/2011 | Morton | B63B 59/00 | 451/75 |
| 2011/0253229 | A1 * | 10/2011 | Mattson | B05B 7/0093 | 137/355.16 |
| 2012/0193445 | A1 * | 8/2012 | Rossner | F04B 17/06 | 239/154 |
| 2013/0122199 | A1 * | 5/2013 | Huda | B05B 16/00 | 427/256 |
| 2013/0122206 | A1 * | 5/2013 | Ahmed | B05B 13/0431 | 118/58 |
| 2013/0236644 | A1 * | 9/2013 | Logan | B05B 15/16 | 118/313 |
| 2014/0220249 | A1 * | 8/2014 | Rouaud | B05B 16/20 | 427/256 |
| 2015/0217318 | A1 * | 8/2015 | Letard | B05B 13/0431 | 118/323 |
| 2016/0067726 | A1 * | 3/2016 | Gilpatrick | B05B 9/01 | 239/526 |
| 2016/0214132 | A1 * | 7/2016 | Morton | B63B 59/00 | |
| 2018/0021800 | A1 * | 1/2018 | Janik | B05B 15/62 | 239/146 |
| 2018/0317627 | A1 * | 11/2018 | Fukuda | B05B 12/124 | |
| 2019/0100047 | A1 * | 4/2019 | Tamaki | B05B 12/126 | |
| 2019/0151881 | A1 * | 5/2019 | O'Connell | B05B 15/658 | |
| 2019/0374966 | A1 * | 12/2019 | Thompson | B05B 13/041 | |
| 2020/0016619 | A1 * | 1/2020 | Raman | B25J 11/0075 | |
| 2020/0197969 | A1 * | 6/2020 | Hegeman | B05B 9/007 | |
| 2021/0162435 | A1 * | 6/2021 | Vanzetto | B05B 5/0415 | |
| 2021/0252532 | A1 * | 8/2021 | Vanzetto | B05B 5/0426 | |
| 2021/0370332 | A1 * | 12/2021 | Tani | B05B 13/0452 | |
| 2021/0387746 | A1 * | 12/2021 | Danko | G01N 21/954 | |
| 2022/0055057 | A1 * | 2/2022 | Thompson | B05B 13/005 | |
| 2022/0184646 | A1 * | 6/2022 | Yoshida | B05B 5/043 | |

* cited by examiner

MODULAR PAINT SPRAYING SYSTEM

CROSS-REFERENCES TO RELATED APPLICATIONS

This application is a continuation of U.S. patent application Ser. No. 16/721,144 filed Dec. 19, 2019 entitled "MODULAR PAINT SPRAYING SYSTEM, which claims the benefit of U.S. Provisional Patent Application No. 62/782,304, entitled "MODULAR PAINT SPRAYING SYSTEM," which was filed on Dec. 19, 2018, all of which are both incorporated by reference in their entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure relates generally to a paint sprayer system for efficiently applying a coat of paint to a large surface. More particularly, the present disclosure relates to a modular paint spraying system that can be adapted to and used on a variety of aerial work platforms for painting large surface areas such as large commercial spaces, such as warehouse walls or building exteriors.

Painting large commercial spaces is traditionally a labor-intensive and time-consuming project. The painting industry has attempted to address this issue with various devices such as paint rollers and sprayers. However, the limitations of the currently available solutions include time constraints, labor costs, and equipment costs. For example, completing a paint job of a commercial space within a limited timeframe may require the use of numerous painters and duplicate equipment for each painter. This is both expensive because of the cost of labor as well as the necessity of purchasing or renting sprayers, pumps, personal protective equipment, and other paint equipment. During labor shortages, it may not be feasible to hire or retain certain personnel to complete the paint job.

Furthermore, many commercial spaces include difficult conditions for painting, such as high ceilings or difficult-to-reach surfaces. These conditions can require a commercial painting crew to procure specialized equipment in order to finish the job according to the client's specifications. Some of the equipment can present a danger to the painters, especially when multiple painters are concurrently working on a single piece of equipment. For example, when a single painter is working on a scaffolding, the danger of falling or tripping on equipment is already present, but the risk is increased when multiple painters work together on the scaffolding, each having their own set of equipment. Other current solutions, such as painter's stilts or suspension systems are likewise dangerous.

Because of the dangers and costs associated with painting commercial spaces, what is needed then are improvements to current systems and methods for painting.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure includes a paint sprayer array. The paint sprayer array may include a paint sprayer array for a modular paint spraying system. The paint sprayer array may include an array frame. The array frame may include a first support member. The paint sprayer array may include an array mount. The array mount may include an array support member. The array mount may be detachably mountable to the array frame. The paint sprayer array may include a plurality of sprayers. Each sprayer of the plurality of sprayers may be detachably mountable to the array support member of the array mount and operable to selectively atomize paint. The paint sprayer array may include a sprayer activation assembly. The sprayer activation assembly may be operable to selectively activate at least a portion of the plurality of sprayers.

Another aspect of the disclosure may include an apparatus. The apparatus may include a paint sprayer apparatus. The apparatus may include a paint sprayer array. The paint sprayer array may include an array frame. The array frame may include a first support member. The paint sprayer array may include an array mount. The array mount may include an array support member. The array mount may be detachably mountable to the array frame. The paint sprayer array may include a plurality of sprayers. Each sprayer of the plurality of sprayers may be detachably mountable to the array support member of the array mount and operable to selectively atomize paint. The paint sprayer array may include a sprayer activation assembly. The sprayer activation assembly may be operable to selectively activate at least a portion of the plurality of sprayers. The apparatus may include a plurality of hoses. Each hose of the plurality of hoses may be in fluid communication with a corresponding sprayer of the plurality of sprayers. The apparatus may include a pump. Each hose of the plurality of hoses may be in fluid communication with the pump. The apparatus may include a paint supply. The paint supply may be in fluid communication with the pump.

Another aspect of the disclosure may include a system. The system may include a modular paint spraying system. The system may include a paint sprayer array. The paint sprayer array may include an array frame. The array frame may include a first support member. The paint sprayer array may include an array mount. The array mount may include an array support member. The array mount may be detachably mountable to the array frame. The paint sprayer array may include a plurality of sprayers. Each sprayer of the plurality of sprayers may be detachably mountable to the array support member of the array mount and operable to selectively atomize paint. The paint sprayer array may include a sprayer activation assembly. The sprayer activation assembly may be operable to selectively activate at least a portion of the plurality of sprayers.

The system may include an aerial work platform. The aerial work platform may include a mobile base. The aerial work platform may include a basket. The paint sprayer array may be detachably mounted to the basket. The aerial work platform may include an extension member. The extension member may include a proximal end engaged with the mobile base and a distal end engaged with the basket. The extension member may be operable to move the basket.

The system may include a plurality of hoses. Each hose of the plurality of hoses may be in fluid communication with a corresponding sprayer of the plurality of sprayers. The system may include a pump. Each hose of the plurality of hoses may be in fluid communication with the pump. The system may include a paint supply. The paint supply may be in fluid communication with the pump. The plurality of hoses may be operable to provide paint from the paint supply to the plurality of sprayers.

Numerous other objects, advantages and features of the present disclosure will be readily apparent to those of skill in the art upon a review of the following drawings and description of a preferred embodiment.

DETAILED DESCRIPTION

Figure 1:
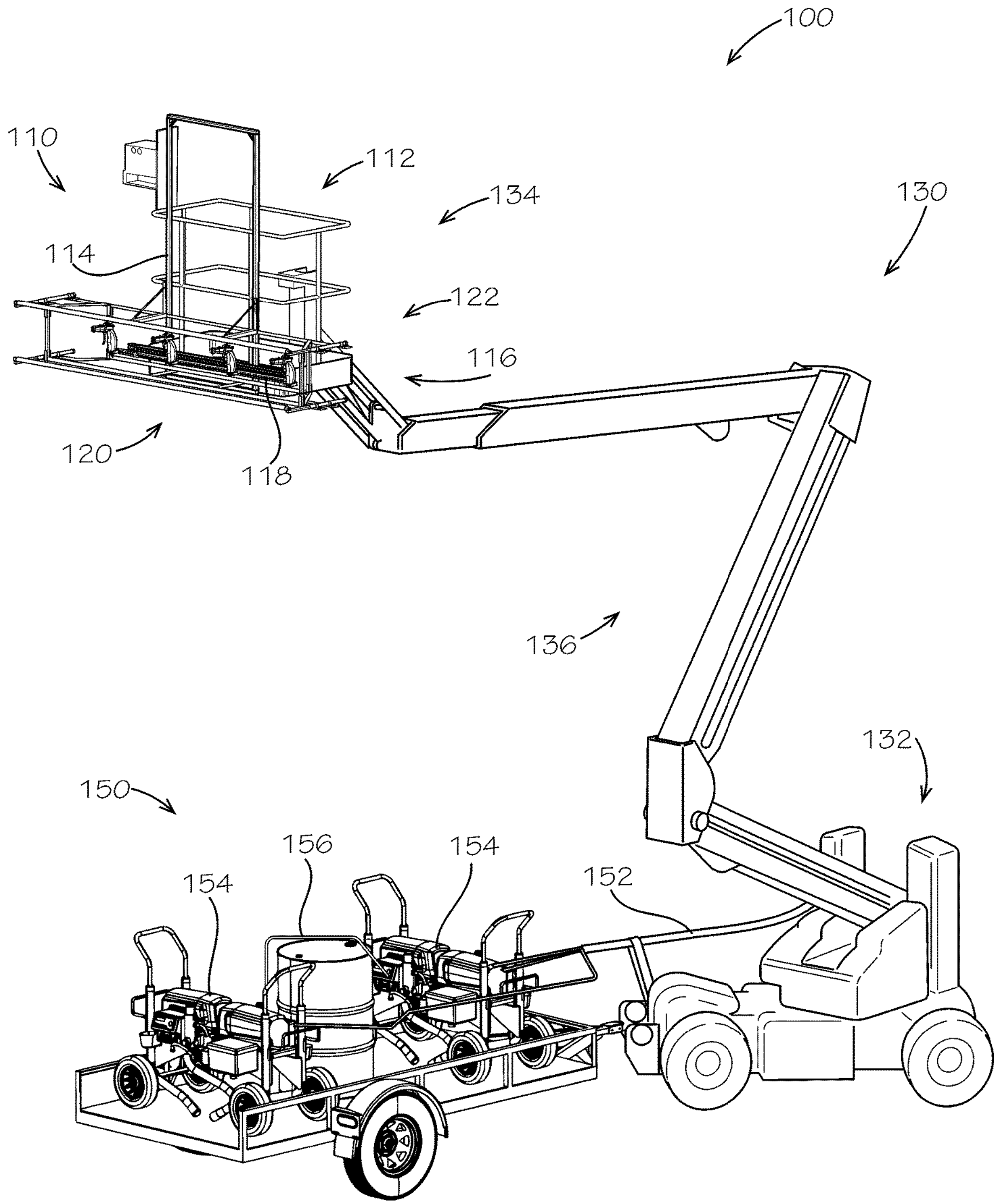
FIG. 1 is a perspective view of one embodiment of a modular paint spraying system.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the depicted system, apparatus, etc. when in the orientation shown in the drawing. A person of skill in the art will recognize that the system, apparatus, etc. can assume different orientations when in use. The term "a" means "at least one" and is not necessarily restricted to referring to a single object.

FIG. 1 depicts one embodiment of a system 100. The system 100 may include a modular paint spraying system. The system 100 may assist a minimal number of painting personnel in painting a large area quickly, efficiently, and safely. The system 100 may be used in painting large surfaces, such as large commercial spaces. The system 100 may include a paint sprayer array 110. The paint sprayer array 110 may include an array frame 112. The array frame 112 may include including a first support member 114. The array frame 112 may include an array mount 116. The array mount 116 may include an array support member 118. The array mount 116 may be detachably mountable to the array frame 112. The pint sprayer array 110 may include a plurality of sprayers 120. Each sprayer of the plurality of sprayers 120 may be detachably mountable to the array support member 118. Each sprayer of the plurality of sprayers 120 may be operable to selectively atomize paint. The system 100 may include a sprayer activation assembly 122. The sprayer activation assembly 122 may be operable to selectively activate at least a portion of the plurality of sprayers 120.

The system 100 may include an aerial work platform 130. The aerial work platform 130 may include a mobile base 132. The aerial work platform 130 may include a basket 134. The paint sprayer array 110 may be detachably mounted to the basket 134. The aerial work platform 130 may include an extension member 136. The extension member 136 may include a proximal end engaged with the mobile base 132 and a distal end engaged with the basket 134. The extension member 136 may be operable to move the basket 134.

The system 100 may include a trailer 150. The trailer 150 may include a plurality of hoses 152. Each hose of the plurality of hoses 152 may be in fluid communication with a corresponding sprayer of the plurality of sprayers 120. The trailer 150 may include a pump 154. Each hose of the plurality of hoses 152 may be in fluid communication with the pump 154. The trailer 150 may include a paint supply 156. The paint supply 156 may be in fluid communication with the pump 154. The plurality of hoses 152 may be operable to provide paint from the paint supply 156 to the plurality of sprayers 120. The pump 154 and the paint supply 156 may be disposed on the trailer 150. The trailer 150 may be detachably coupled to the aerial work platform 130.

Figure 2:
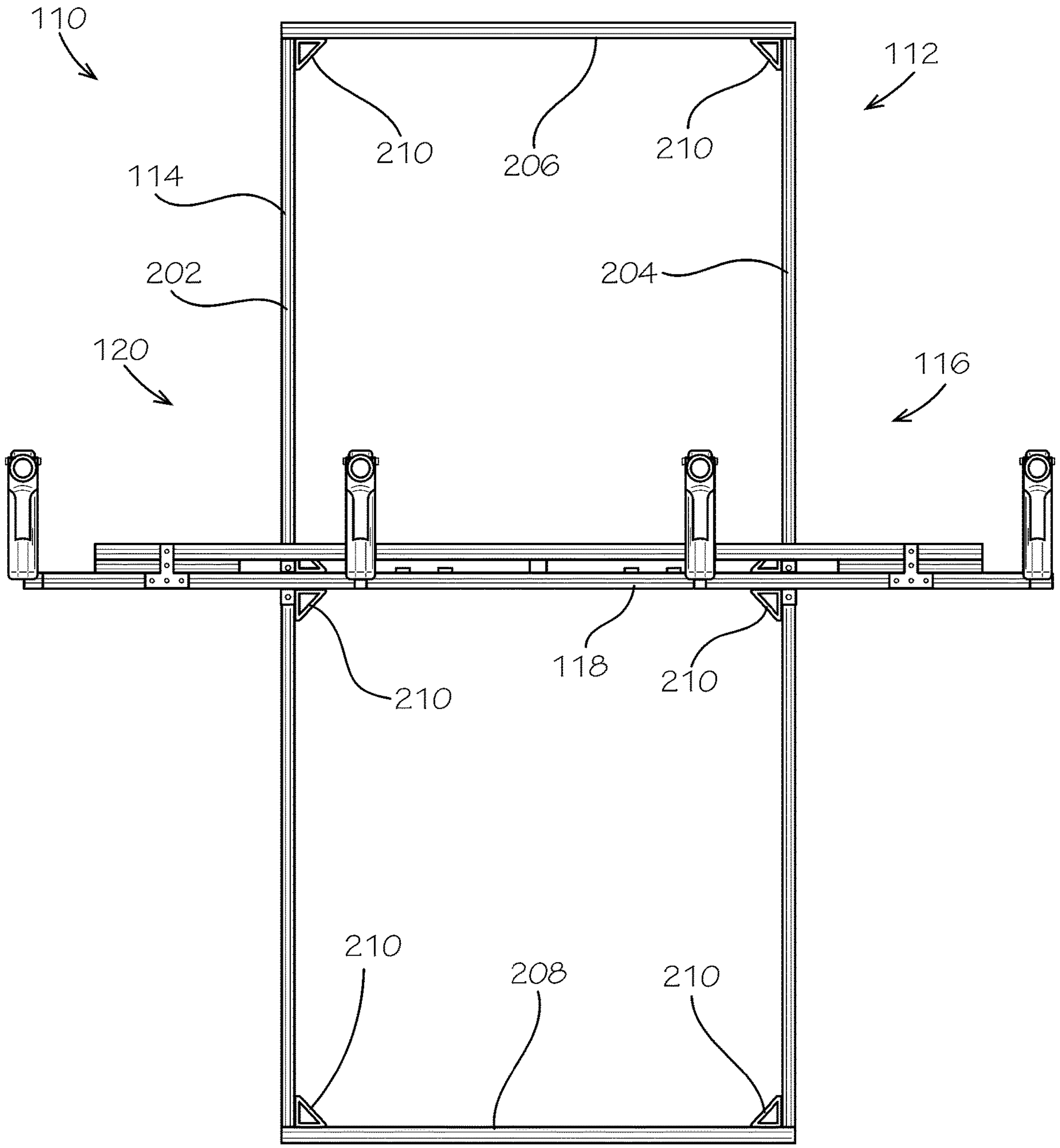
FIG. 2 is a front view depicting one embodiment of the paint sprayer array included in FIG. 1.

FIG. 2 depicts one embodiment of the paint sprayer array 110. The paint sprayer array 110 may include the array frame 112, the first support member 114, the array mount 116, the array support member 118, and the plurality of sprayers 120. In some embodiments, the array frame 112 may provide a location for the plurality of sprayers 120 to mount to. The array frame 112 may mount to the basket 134 of the aerial work platform 130.

In some embodiments, the array frame 112 may include the first support member 114. As depicted in FIG. 2 and elsewhere in the Figures, the first support member 114 may include an elongated bar. The elongated bar may include metal, plastic, or some other rigid material. The first support member 114 may include a rectangular cross-section. The first support member 114 may include one or more fastening slots 202. A fastening slot 202 may be disposed along the length of the first support member 114. The fastening slot 202 may be operable to provide a surface for detachably coupling other components of the paint sprayer array 110 to the first support member. The fastening slot 202 may include an open end at an end of the first support member 114 that allows a fastener to enter the fastening slot 202 and slide to different positions along the fastening slot 202. The one or more fastening slot 202 may permit various components or items to be quickly fastened to the first support member 114.

The array frame 112 may include a second support member 204. The second support member 204 may include similar features as the first support member 114, such as an elongated bar or one or more fastening slots 202. The second support member 204 may be disposed parallel to the first support member 114. The array frame 112 may include a first cross member 206. The first cross member 206 may span between the first support member 114 and the second support member 204 at a first position. The array frame 112 may include a second cross member 208. The second cross member 208 may span between the first support member 114 and the second support member 204 at a second position. The first position may include a location at a first end of the first support member 114 and the second support member 204. The second location may include a location at a second end of the first support member 114 and the second support member. Each of the first and second cross members 206, 208 may include similar features as the first or second support members 114, 204.

As used herein, the term "support member 114, 204, 206, or 208" may refer to the first support member 114, the second support member 204, the first cross member 206, or the second cross member 208. A support member 114, 204, 206, or 208 may include an elongated bar. The support members 114, 204, 206, or 208 may include different sizes, lengths, or dimensions. For example, as seen in FIG. 2, the first and second support members 114, 204 may be the same length, and the first and second cross members 206, 208 may be the same length and may have a length that is shorter than the length of the first and second support members 114, 204.

In one or more embodiments, the first and second frame support members 114, 204 and the first and second cross members 206, 208 may be fastened to each other. The support member 114, 204, 206, and 208 may be fastened to each other via their respective fastening slots 202. For example, as shown in FIG. 2, one or more internal corner brackets 210 may couple the first and second frame support members 114, 204 and the first and second cross members 206, 208 via their respective fastening slots 202. This may allow for various array frame 112 shapes, sizes and combinations that may be used to accommodate various array mounts 116 on the array frame 112 or allow for various mounting orientations and means.

In some embodiments, the array mount 116 may be detachably mountable to the first support member 114. The array mount 116 may be detachably mountable to the second support member 204. The array mount 116 may be detachably mountable at a plurality of positions along the first support member 114 and the second support member 204. As depicted in FIG. 2, the array mount 116 may be mounted at a central position along the lengths of the first support member 114 and the second support member 204. However, as seen in FIG. 1, the array mount 116 may be mounted at a lower position along the first support member 114 and the second support member 204. The array mount 116 may be mounted at various positions along the lengths of the first support member 114 and the second support member 204. In some embodiments, discussed later, the array mount 116 may be mounted to a single support member 114, 204, 206, and 208 (e.g., the array mount 116 may be disposed vertically and mounted to the first support member 114).

Figure 3A:
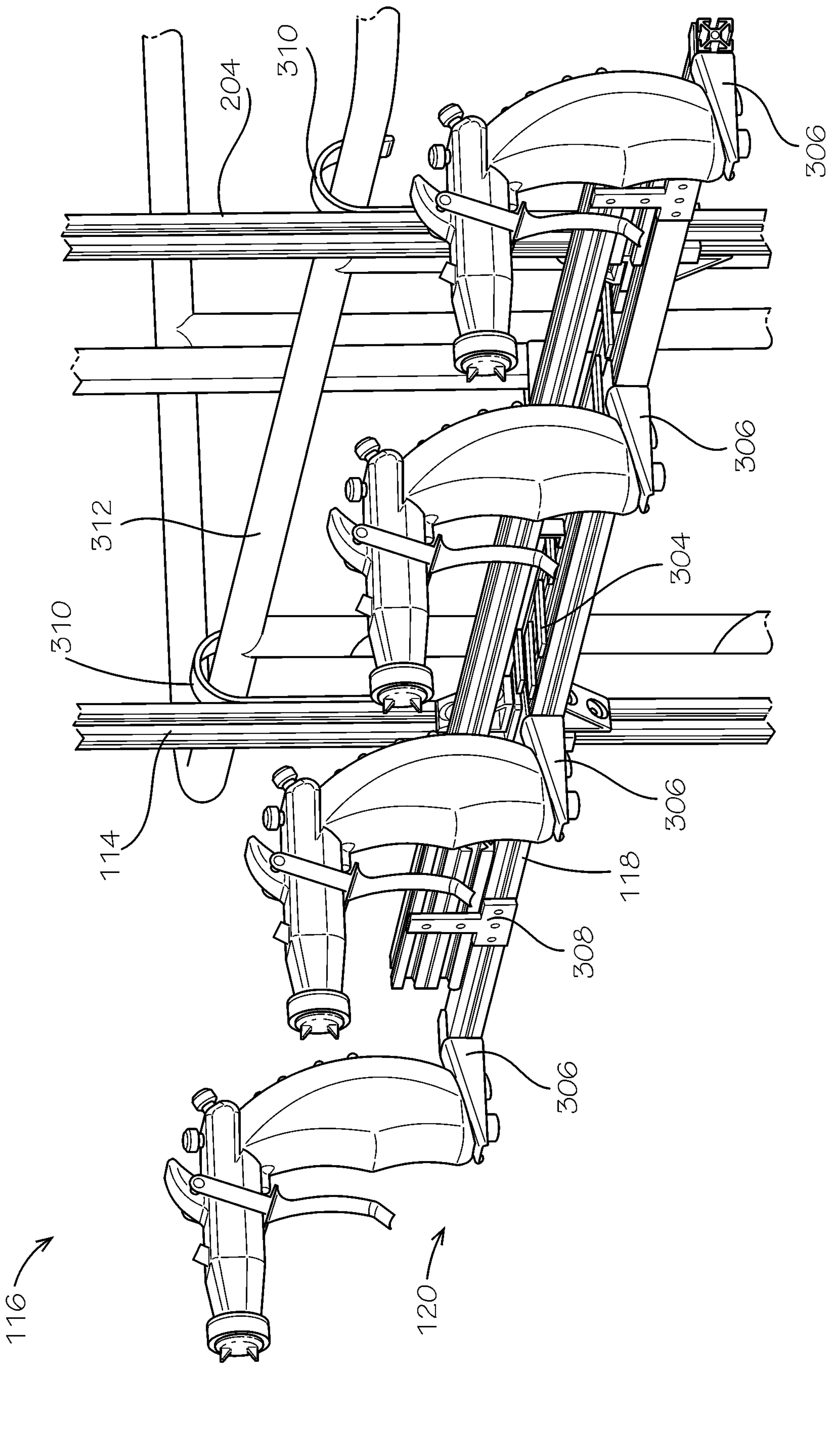
FIG. 3A is a perspective view depicting one embodiment of the array mount of the paint sprayer array of FIG. 2.
Figure 3B:
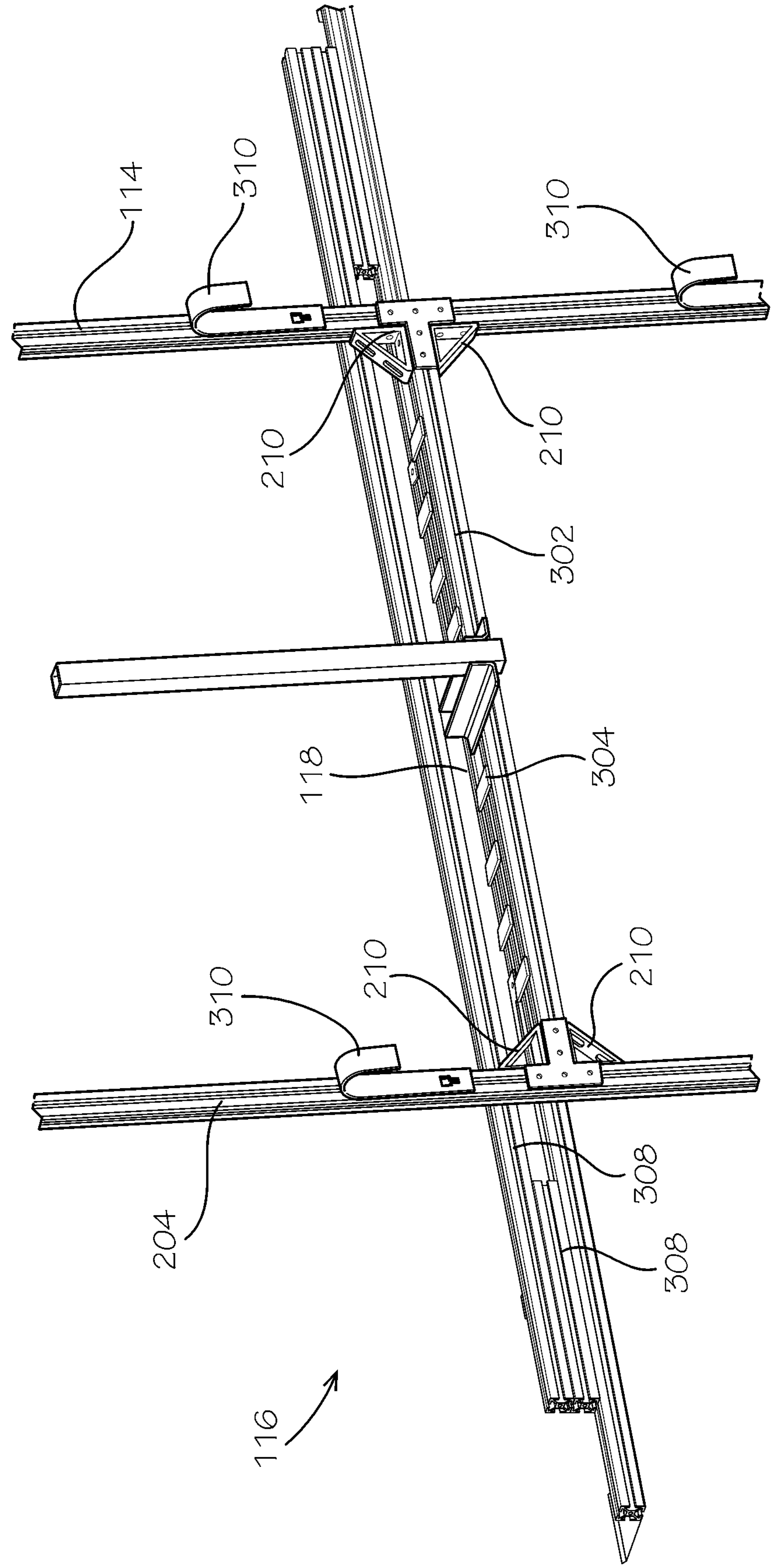
FIG. 3B is a perspective view depicting the back of the array mount depicted in FIG. 3A.

FIG. 3A and FIG. 3B depict the array mount 116. FIG. 3A depicts an angled view of the front side of the array mount 116 (with the plurality of sprayers 120) and FIG. 3B depicts an angled view of the back side of the array mount 116 (without the plurality of sprayers 120). The array mount 116 may include one or more structures configured to detachably mount to the array frame 112. The array mount 116 may include one or more structures that provide a location to mount the plurality of sprayers 120. The array mount 116 may include similar structures to the support members 114, 204, 206, or 208. For example, the array mount 116 may include one or more elongated bars with one or more fastening slots 202. The array mount 116 may be detachably coupled to the first support member 114. The array mount 116 may be detachably coupled to the second support member 204. For example, one or more corner brackets 210 may couple the array mount 116 to the first and second support members 114, 202. The array mount 116 may be detachably couplable to the first and second support members 114, 202 at various locations along the first and second support members 114, 202. For example, as depicted in FIG. 2 and FIGS. 3A-B, the array mount 116 may be coupled to a middle portion of the first and second support members 114, 202. However, in FIG. 1, the array mount 116 may detachably couple to a lower portion of the first and second support members 114, 202.

In one embodiment, the array mount 116 may include a frame mount member 302. The frame mount member 302 may include similar structures to those of the support members 114, 204, 206, or 208. For example, the frame mount member 302 may include one or more elongated bars with one or more fastening slots 202. The frame mount member 302 may detachably mount to the array frame 112 via one or more internal corner brackets 210. The array mount 116 may be detachably coupled to the array frame 112 such that the array frame 112 supports the array mount 116 when the two are coupled.

In one embodiment, the array mount 116 may include the array support member 118. The array support member 118 may include similar structures to those of the support members 114, 204, 206, or 208. For example, the array support member 118 may include one or more elongated bars with one or more fastening slots 202. The array support member 118 may be disposed next to the frame mount member 302. The array support member 118 may be disposed parallel to the frame mount member 302. The array support member 118 may detachably couple to the frame mount member 302. For example, the array support member 118 may detachably couple to the frame mount member 302 via one or more fastening tabs 304. A fastening tab 304 may include a tab with one or more apertures that fasteners may penetrate and fasten together components of the array mount 116.

In some embodiments, the array mount 116 may include one or more sprayer mounts 306. A sprayer mount 306 may include a structure for supporting a sprayer of the one or more sprayers 120 on. For example, as depicted in FIG. 3A, a sprayer mount 306 may include a triangular tab that includes one or more apertures. The apertures may allow the a corresponding sprayer to couple to the sprayer mount 306 or may allow a hose of the plurality of hoses 152 or some other tube or line to pass through the sprayer mount 306 and couple to the sprayer. The one or more sprayer mounts 306 may detachably couple to a fastening slot 202 of the array support member 118.

In some embodiments, varying the positioning of the plurality of sprayers 120 along the array support member 118 may result in different paint applications. For example, some sprayers may apply paint in a narrow spray pattern, and other sprayers may apply paint in a wider spray pattern. Certain sprayers may apply paint of a certain viscosity better than other sprayers. These differences in sprayer pattern, viscosity, or other paint or sprayer characteristics may result in a user using different positioning of the plurality of sprayers 120 in order to achieve the desired paint application. In some embodiments, the different positioning may include the plurality of sprayers 120 having specific axial spacing relative to each other along the array support member 118.

In one embodiment, a spray nozzle and spray tip combination may provide a 24 inch fan width at a distance of twelve inches from the application surface. In this embodiment, the plurality of sprayers 120 may be axially spaced along the array support member 118 at intervals of twelve inches such that the plurality of sprayers 120, when oriented such that the spray patterns are aligned along a single axis parallel to the longitudinal axis, provide an overlapping spray pattern with the adjacent spray nozzles. In this manner, when a plurality of four sprayers 120 are implemented on the array mount 116, the paint sprayer array 110 may be capable of providing a five-foot spray pattern. The adjustability of the plurality of sprayers 120 relative to each other on the array support member 118 may be advantageous if the spray nozzle or spray tip implemented in a specific embodiment requires other spacing, or when the plurality of sprayers 120 operate outside of listed parameters. Thus, adjustments may be implemented to account for real-world circumstances specific to each device.

In one or more embodiments, the array support member 118 may include one or more markings. The one or more markings may be disposed on the array support member 118. A marking may indicate a placement for a sprayer of the plurality of sprayers or a placement of a sprayer mount 306. The position of the one or more markings on the array support member 118 may be based on a sprayer, the type of paint used, the object being painted, a desired paint application, or other factors. Different sets of markings for different sets of positions may be present on the array support member 118. The different sets of markings may include different colors, fonts, sizes, or other marking characteristics in order for a user to determine the specific positioning indicated by the set of markings or in order for the user to distinguish one set of markings from another set of markings.

In one embodiment, the array mount 116 may include one or more auxiliary array support members 308. An auxiliary array support member 308 may include similar structures to those of the support members 114, 204, 206, or 208 (e.g., one or more elongated bars with one or more fastening slots 202). An auxiliary array support member 308 may be disposed next to the array support member 118. For example, as depicted in FIGS. 3A-B, several auxiliary array support members 308 are disposed above and coupled to the array support member. The one or more auxiliary array support members 308 may detachably couple to the array support member via one or more fastening tabs 304.

The plurality of sprayers 120 may detachably mount to the array support member 118. For example, as discussed above and shown in FIG. 3A, each sprayer may mount to a sprayer mount 306 disposed on the array support member 118. In some embodiments, a sprayer of the plurality of sprayers 120 may include a sprayer operable to receive paint (e.g., via a hose coupled to the sprayer). Each sprayer may be operable to atomize the received paint and spray the atomized paint via a nozzle of the sprayer.

The paint sprayer array 110 may detachably mount to the basket 134. For example, in one embodiment, the array frame 112 may include one or more hooks 310. The paint sprayer array 110 may detachably mount to the basket 134 via the one or more hooks 310 engaging with the basket 134. As depicted in FIG. 3A, the one or more hooks 310 may be lowered onto a railing 312 of the basket 134 and the paint sprayer array 110 may rest on the railing 312. The one or more hooks 310 may engage with another part of the basket 134 such as a floor of the basket 134, a roof of the basket 134, or some other portion of the basket 134. In some embodiments, an different mechanism may detachably couple the paint sprayer array 110 to the basket 134, such as a fastener.

Figure 4:
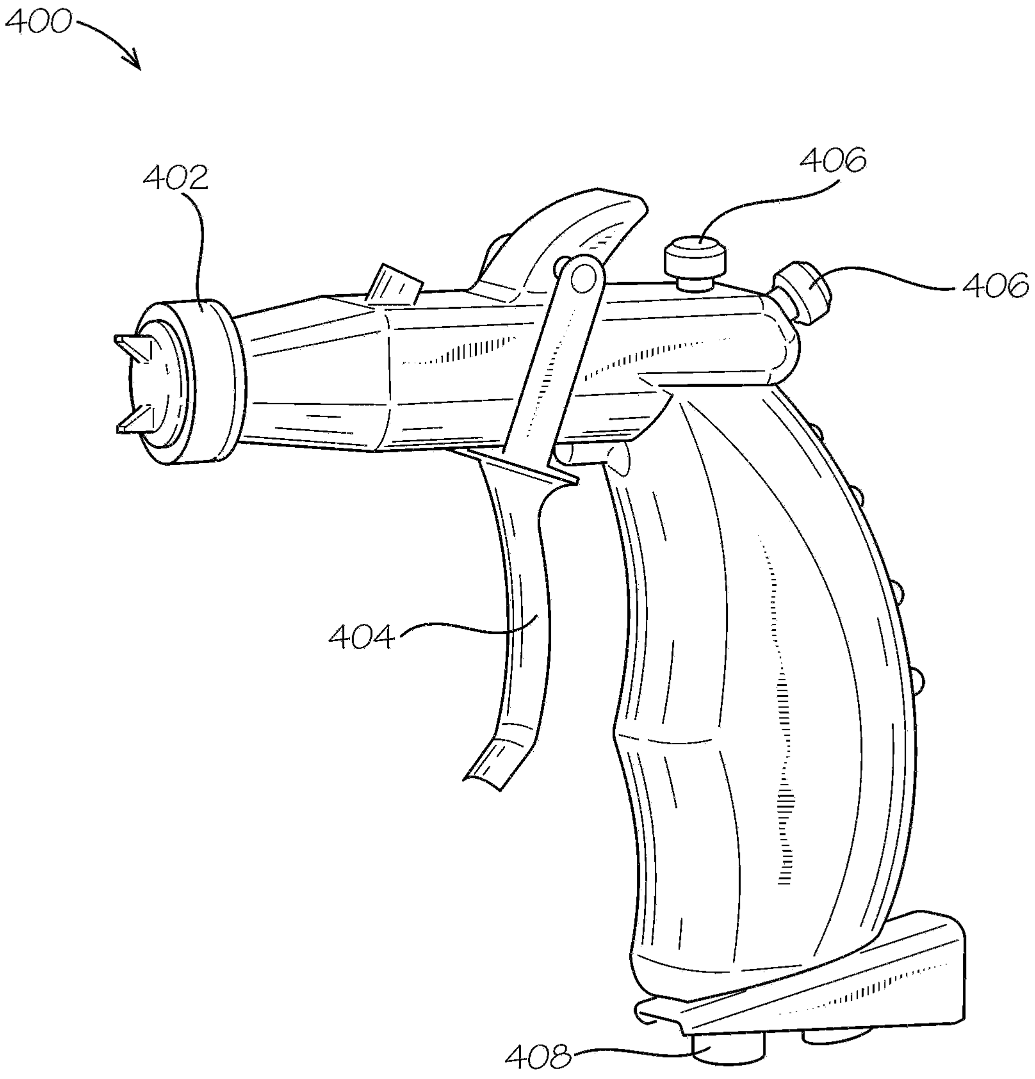
FIG. 4 is a perspective view depicting one embodiment of a sprayer of the paint sprayer array included in FIG. 3A.

FIG. 4 depicts one embodiment of a sprayer 400. The sprayer 400 may be operable to selectively atomize paint. The sprayer 400 may include a nozzle 402. The nozzle 402 may include one or more apertures that expel atomized paint. The nozzle 402 may be adjustable. Adjusting the nozzle 402 may adjust a spray pattern of the sprayer 400. The sprayer 400 may include a trigger 404. The trigger 404 may be biased in a neutral position. In response to the trigger 404 being pulled and not being in the neutral position, the sprayer 400 may atomize paint and expel the atomized paint. In response to the trigger 404 ceasing to be pulled, the trigger 404 may return to the neutral position and may cease atomizing and expelling paint.

The sprayer 400 may include one or more intake ports 406. An intake port 406 may receive paint, air, or another fluid from a hose of the plurality of hoses 152. The sprayer 400 may include one or more fasteners 408. The one or more fasteners 408 may detachably mount the sprayer 400 to a sprayer mount 306, the array support member 118, or another component of the paint sprayer array 110.

Figure 5A:
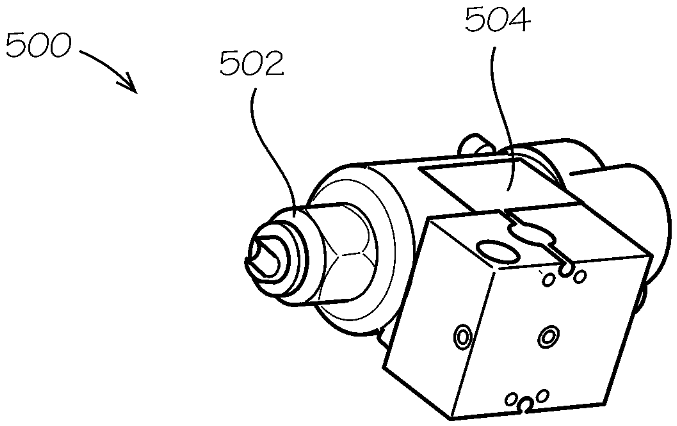
FIG. 5A is a perspective view depicting another embodiment of a sprayer.
Figure 5B:
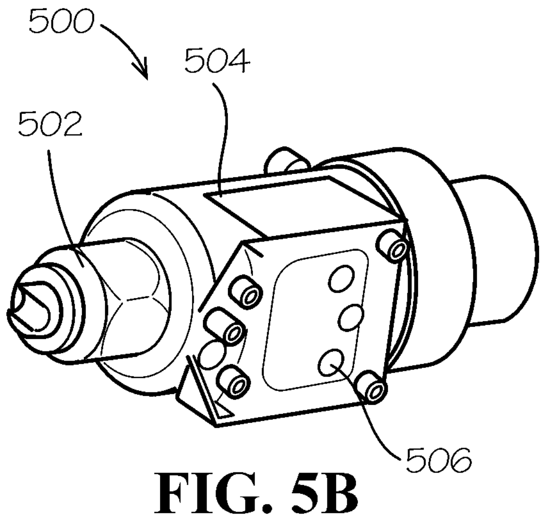
FIG. 5B is a perspective view depicting one embodiment of the sprayer of FIG. 5A.
Figure 5C:
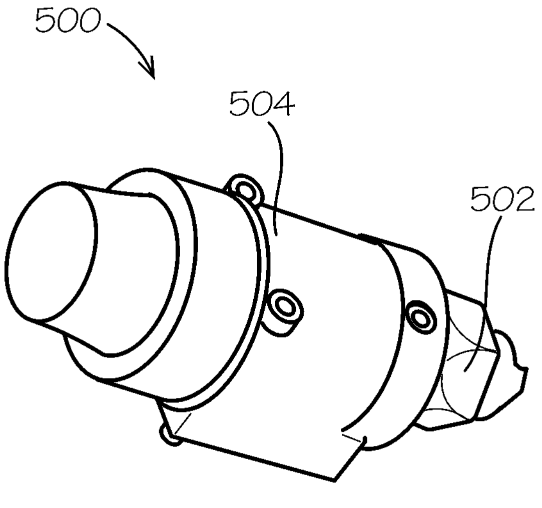
FIG. 5C is a perspective view depicting one embodiment of the sprayer of FIG. 5B.

FIG. 5A, FIG. 5B, and FIG. 5C depict various views of another embodiment of a sprayer 500. The sprayer 500 may also be operable to selectively atomize paint. The sprayer 500 may include a nozzle 502. The nozzle 502 may also be adjustable and provide various spray patterns based on the configuration of the nozzle 502. The sprayer 500 may include a solenoid control valve 504. The solenoid control valve 504 may be operable to cause the selective paint atomization of the sprayer 500 in response to user interaction with the sprayer activation assembly 122. For example, the sprayer activation assembly 112 may include a foot pedal, and in response to the user pressing his or her foot down on the foot pedal, the solenoid control valve 504 of the sprayer may open and allow paint from a hose detachably coupled to an intake port 506 of the sprayer 500 to enter an atomization chamber in the sprayer 500 and become atomized.

Figure 6:
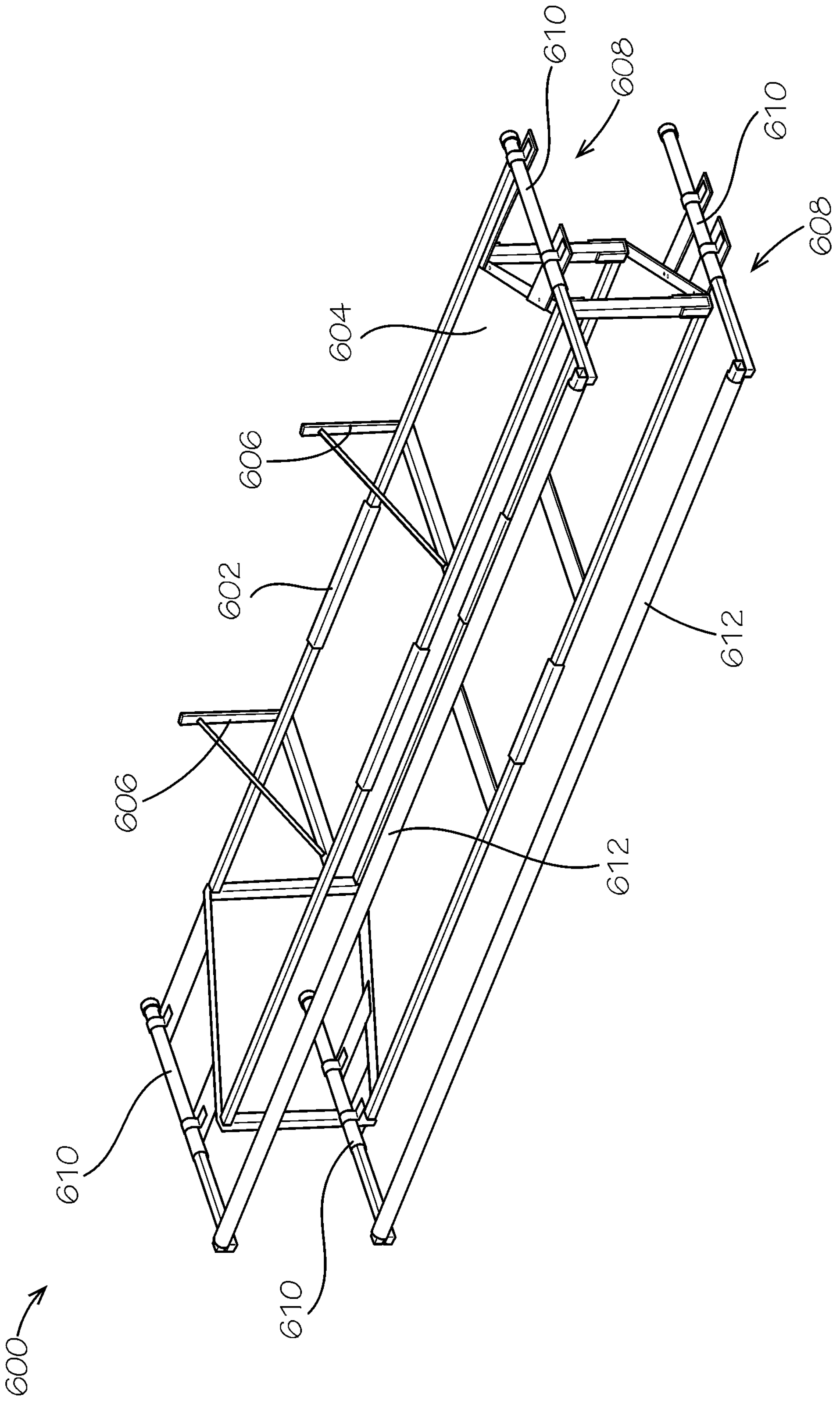
FIG. 6 is a perspective view depicting one embodiment of a shield assembly of the paint sprayer array included in FIG. 1.

FIG. 6 depicts one embodiment a shield assembly 600. The shield assembly 600 may protect the array frame 112, the basket 134, or a user positioned in the basket 134 from atomized paint expelled from the plurality of sprayers 120. The shield assembly 600 may detachably mount to the array frame 112. The shield assembly 600 may include a shield frame 602. The shield frame 602 may be disposed around the plurality of sprayers 120. The shield assembly 600 may include one or more shielding members 604. A shielding member 604 may be disposed on the shield frame 602.

In one embodiment, the shield assembly 600 may detachably mount to the array frame 112 via one or more shield corner brackets 606. The one or more shield corner brackets 606 may detachably couple to fastener slots 202 of the array frame 112 such as the fastener slots 202 of the first and second support members 114, 204. In some embodiments, the shield frame 602 may include one or more shield frame 602 members fastened together to create a quadrilateral prism structure. The quadrilateral prism structure may include a trapezoidal structure (as depicted in FIG. 6), a rectangular structure, or some other shape. In some embodiments, a shielding member 604 may include a panel. The panel may include a metal panel, a plastic panel, or some other material. The shielding member 604 may include a flexible material, such as plastic wrap, wrapped around various parts of the shield frame 602. The shield assembly 600 may not include the one or more shielding members 604 disposed in front of the plurality of sprayers 120.

In some embodiments, the shield assembly 600 may include a paint roller assembly 608. The paint roller assembly 608 may include two or more mounting members 610. The two or more mounting members 610 may be coupled to the shield assembly 600. In some embodiments, the two or more mounting members 610 may be coupled to the array frame 112 or the array mount 116. The two or more mounting members 610 may extend from the shield assembly 600, the array frame 112, or the array mount 116. The paint roller assembly 608 may include a roller crossbar 612. The roller crossbar 612 may be rotatably engaged with the two or more mounting members 610. The roller crossbar 612 may be rotatable about an axis. The axis may extend through the length of the roller crossbar 612. A paint roller surface may be disposed on the roller crossbar 612. The paint roller surface may engage with a painted surface.

A user of the system 100 may move the paint roller assembly 608 to engage with a painted surface. The painted surface may include wet paint that was sprayed onto the painted surface by the plurality of sprayers 120. The roller crossbar 612 may distribute wet paint about the painted surface. In some embodiments, as depicted in FIG. 6, the paint sprayer array 110 may include multiple paint roller assemblies 608. A first paint roller assembly 608 may be disposed above the plurality of sprayers 120, and a second paint roller assembly 608 may be disposed below the plurality of sprayers 120.

Figure 7:
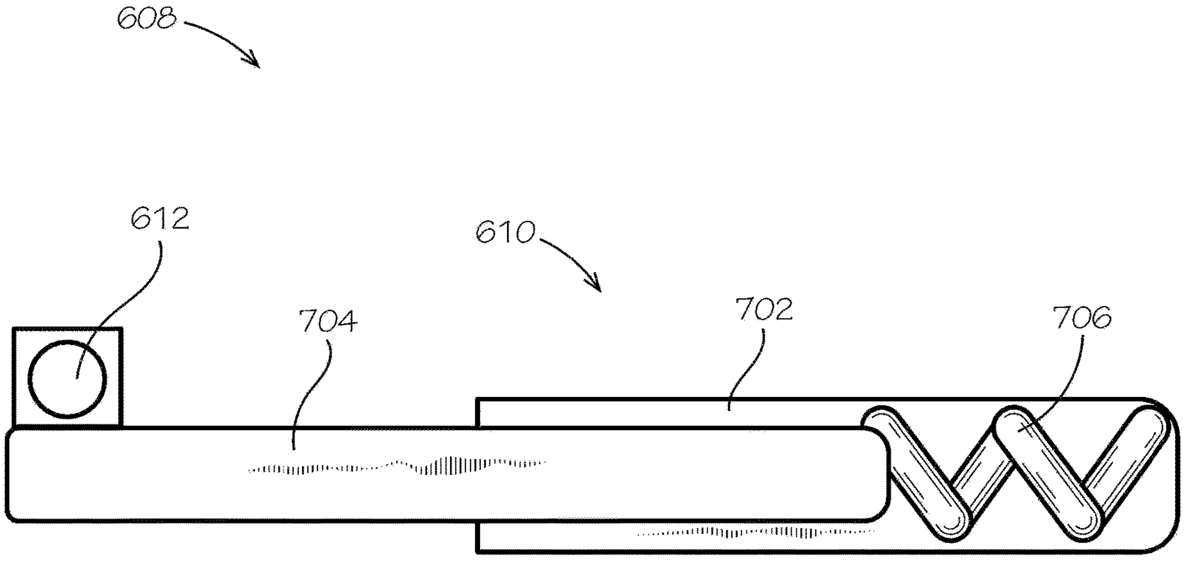
FIG. 7 is a cutaway side view depicting one embodiment of a mounting member of the paint roller assembly of FIG. 6.

FIG. 7 depicts one embodiment of the paint roller assembly 608. The mounting member 610 of the paint roller assembly 608 may include a housing 702. The mounting member 610 may include an extension member 704. The mounting member 610 may include a spring 706. The extension member 704 may protrude out of the housing 702. The extension member 704 may engage with the roller crossbar 612. The spring 706 may be disposed inside the housing 702. The spring 706 may be engaged with the housing 702 at one end and the extension member 704 at the opposite end. The spring 706 may be selectively compressible. The spring 706 may compress in response to the roller crossbar 612 engaging with an object, such as a painted surface. The spring 706 may allow the basket 134 to move closer to the object and engage the object at a variety of distances from the object without damaging the paint sprayer array 110.

Figure 8:
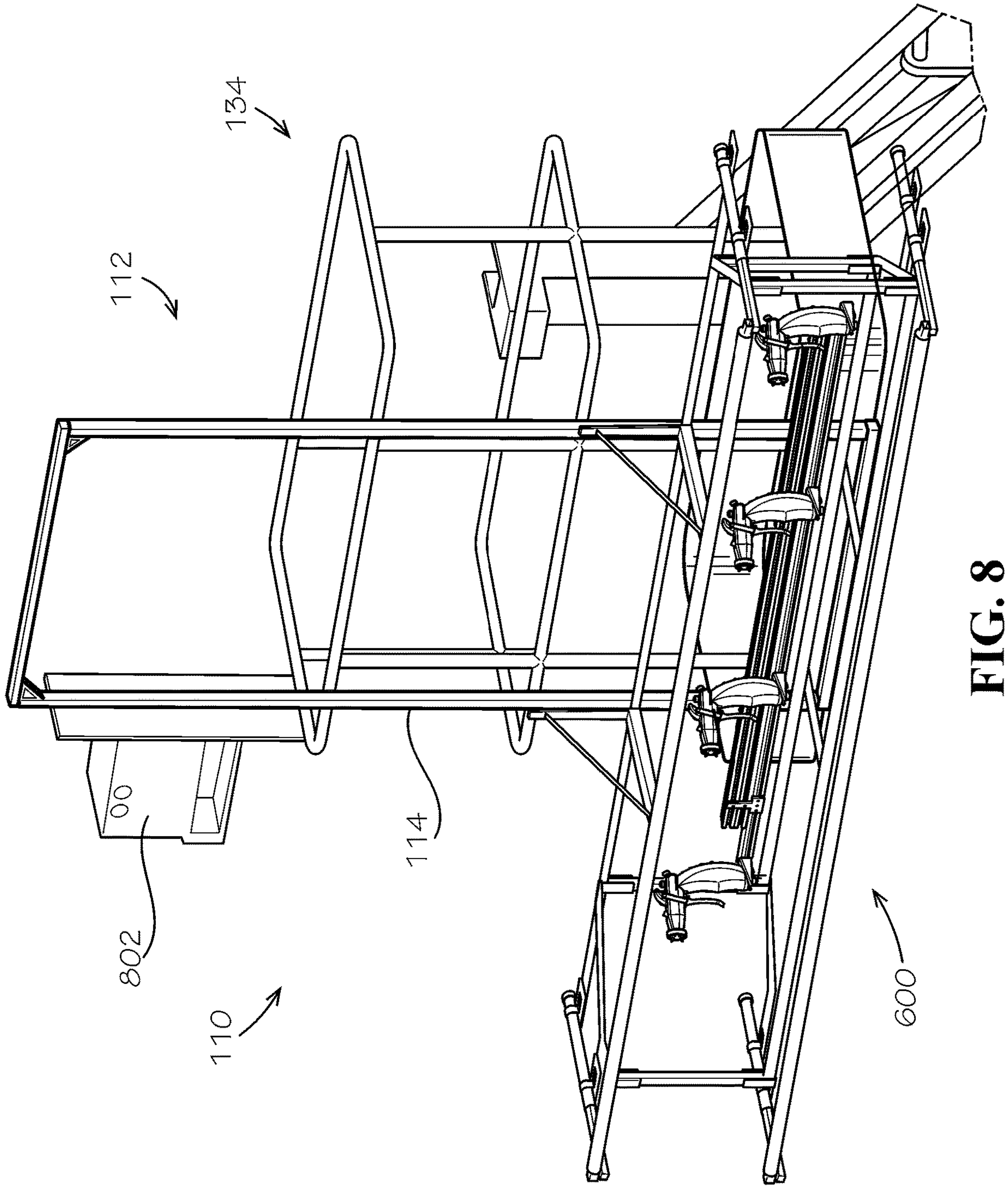
FIG. 8 is a perspective view depicting one embodiment of the paint sprayer array mounted to the basket of the aerial work platform of FIG. 1.

FIG. 8 depicts one embodiment of the paint sprayer array 110 with an attached shielding assembly 600. The paint sprayer array 110 may be detachably mounted on the basket 134 of the aerial work platform 130. In some embodiments, the paint sprayer array 110 may include a distance sensor assembly 802. The distance sensor assembly 802 may be mounted to the array frame 112. The distance sensor assembly 802 may be operable to sense a distance from the distance sensor assembly 802 to an object disposed in front of the distance sensor assembly 802. The distance sensor assembly 802 may be operable to display an output based on the distance. The distance sensor assembly 802 may include an ultrasonic sensor, an infrared sensor, or a laser rangefinder. The distance sensor assembly 802 may be mounted to the first support member 114 of the array frame 112, as depicted in FIG. 8. The distance sensor assembly 802 may sense a distance from the distance sensor assembly 802 to a surface to be painted (e.g., a wall).

Figure 9A:
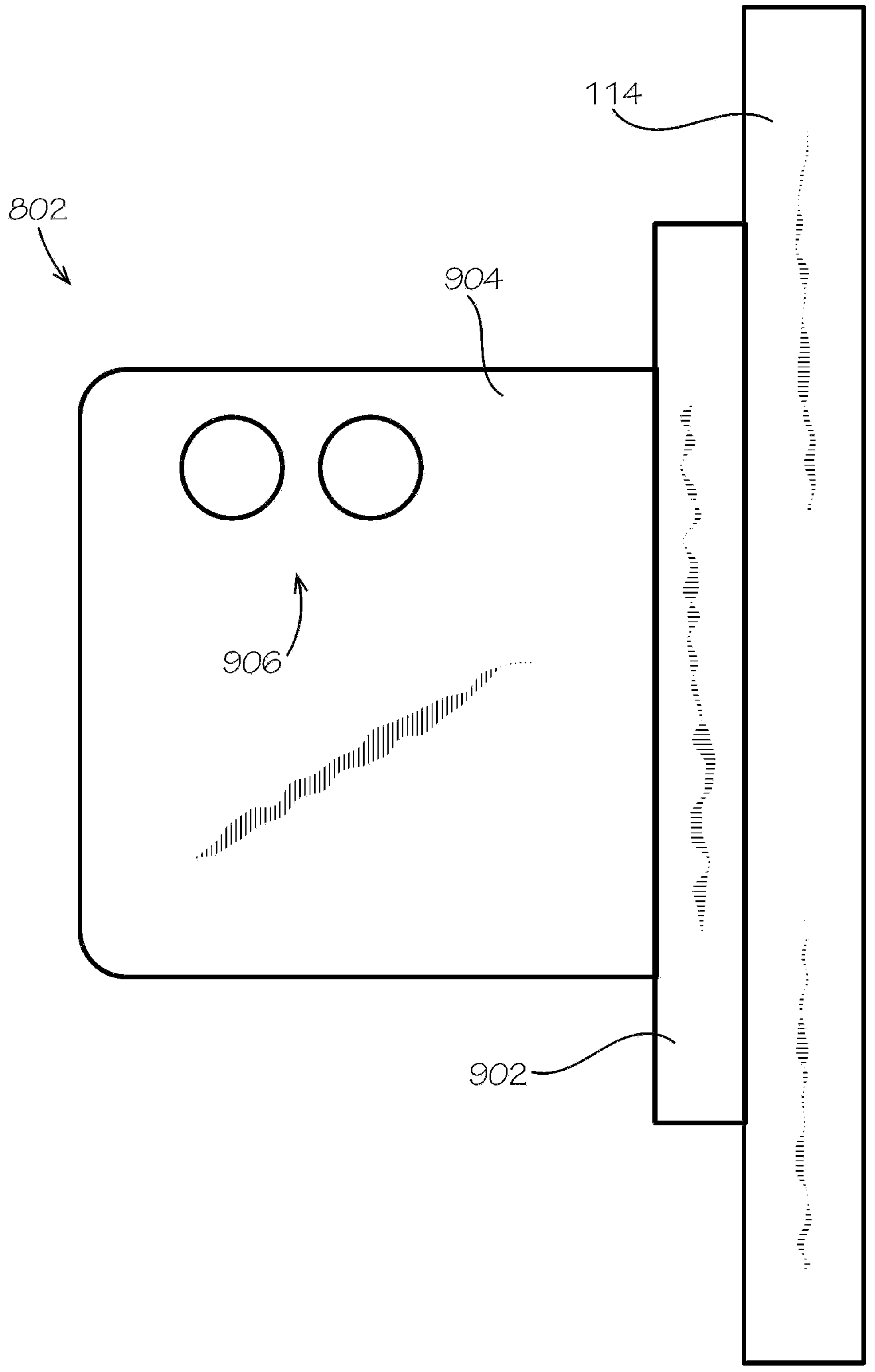
FIG. 9A is a front view depicting one embodiment of the distance sensor assembly included in FIG. 8.

FIG. 9A depicts one embodiment of the distance sensor assembly 802. The distance sensor assembly 802 may include a mounting member 902. The mounting member 902 may include a surface that may engage with the first support member 114. The mounting member 902 may include one or more fasteners that engage with a fastening slot 202 of the first support member 114 to dispose the distance sensor assembly 802 on the first support member 114. The distance sensor assembly 802 may include a housing 904. The housing 904 may hold various components of the distance sensor assembly 802. The housing 904 may be disposed around electronics or circuitry of the distance sensor assembly 802. The distance sensor assembly 802 may include one or more distance sensors 906. The distance sensors 906 may be operable to detect a distance from the distance sensors 906 to an object in front of the distance sensor 906.

In one embodiment, a distance sensor 906 may include ultrasonic sensor. The distance sensor 906 may emit an ultrasonic soundwave. The ultrasonic soundwave may reflect off of the object in front of the distance sensor 906 and return to the distance sensor 906. The distance sensor 906 may detect the reflected soundwave, and circuitry of the distance sensor assembly 802 may determine a distance from the distance sensor 906 based on the reflected soundwave. Other types of distance sensors 906 may include infrared sensors, laser rangefinders, or optical sensors.

In some embodiments, the circuitry, electronics, or other components of the distance sensor assembly 802 may store distances or distance ranges. The circuitry, electronics, or other components may store performance values associated with the distances or distance ranges. A performance value may indicate how well the paint sprayer assembly 110 may perform at the associated distance or distance range. As an example, the circuitry, electronics, or other components may store the ranges "less than 3 feet," "3 feet to 5 five," and "more than five feet." The associated performance values may include, respectively, "too close," "in good range," "too far away." Thus, in some embodiments, the paint sprayer array 110 at a detected distance of less than 3 feet away may not paint as well as at a detected distance of 3 to 5 feet.

The distances or distance ranges and their associated performance values may be customizable. In some embodiments, the circuitry, electronics, or other components of the distance sensor assembly 802 may automatically adjust the distances or distance ranges and their associated performance values or a user may adjust them. The distances or distance ranges and their associated performance values may be based on a configuration of the plurality of sprayers 120 on the array support member 118, a type of sprayer of the plurality of sprayers 120, or some other characteristics of the paint sprayer array 110.

Figure 9B:
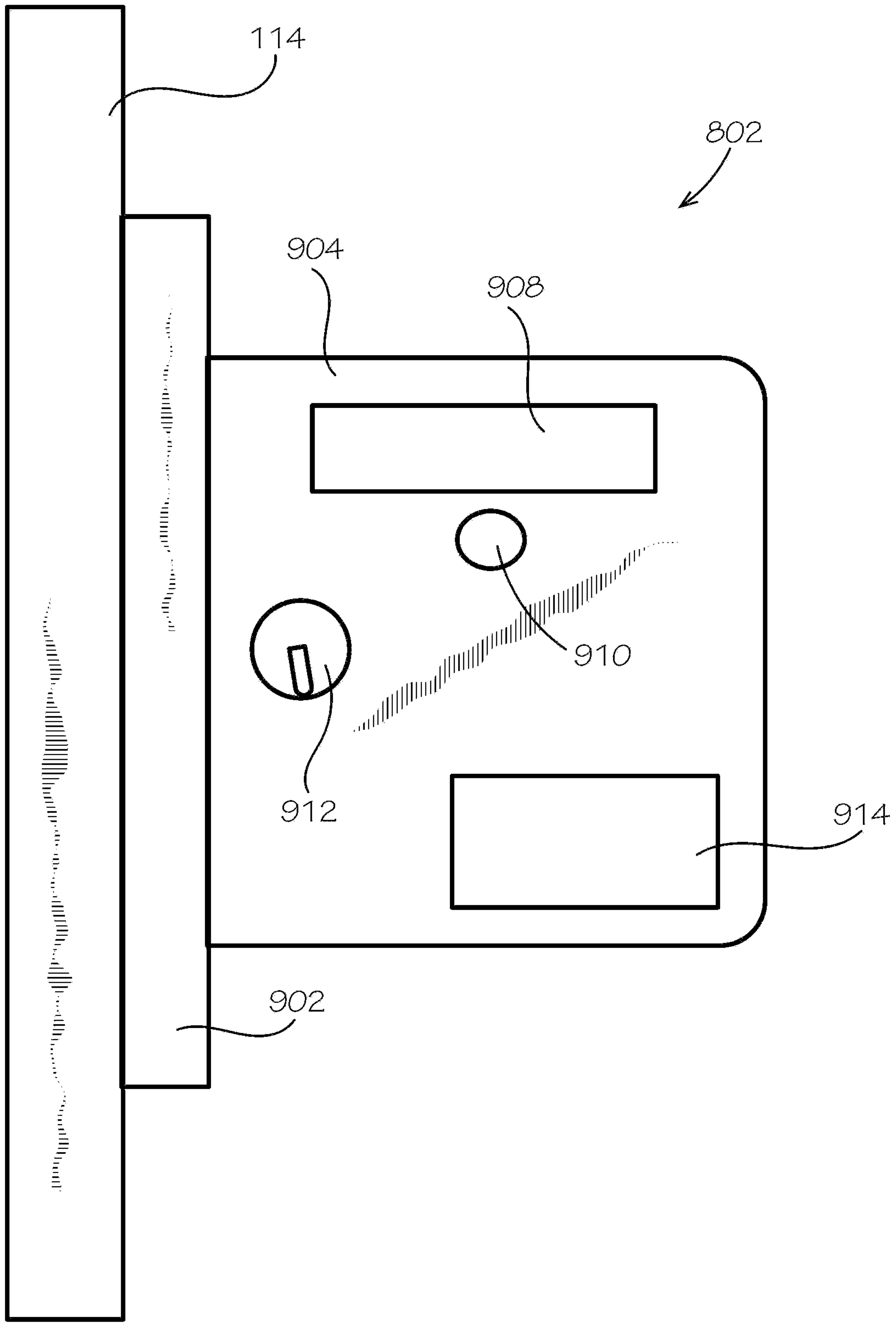
FIG. 9B is a rear view depicting one embodiment of the distance sensor assembly of FIG. 8.

FIG. 9B depicts a second side of the distance sensor assembly 802. The second side may be disposed opposite the first side depicted in FIG. 9A. The distance sensor assembly 802 may include a display 908. The display 908 may be operable to display information about a distance detected by the distance sensors 906. The display 908 may include a liquid crystal display (LCD) screen or some other display screen. The display 908 may display a distance value indicating the distance from the distance sensors 906 to the object in front of the distance sensors 906 (e.g., 6 feet, 3 meters, 45 inches, etc.). The display 908 may display text giving information to a user. The text may include a performance value based on the detected distance, as discussed above.

The distance sensor assembly 802 may include a distance indicator 910. The distance indicator 910 may include a component that may change how it is displayed based on a distance detected by the distance sensors 906. The distance indicator 910 may include a light that changes color, brightness, or some other characteristic based on the detected distance. For example, in response to the performance value based on the detected distance being "in good range," the distance indicator 910 may light up green or at an intense brightness. In response to the performance value being "move back" or "move closer," the distance indicator 910 may light up yellow or at a less-intense brightness. In response to the performance value being "out of range," the distance indicator 910 may light up red or may not light up at all.

The distance sensor assembly 802 may include one or more controls 912. The one or more controls 912 may allow a user to interact with the distance sensor assembly 802 or adjust the distance sensor assembly 802. The one or more controls 912 may include one or more buttons, levers, dials, or other control components. The one or more controls 912 may be operable to power the distance sensor assembly 802 on or off, adjust the display 908 (e.g., the display's 908 brightness, contrast, color, etc.), or adjust or customize the distance or distance ranges and their associated performance values.

The distance sensor assembly 802 may include a battery 914. The battery 914 may be disposable in a battery slot in the housing 904. The battery 914 may power the various components of the distance sensor assembly 802. In some embodiments, the distance sensor assembly 802 may include a power cord, and the power cord may supply power to the distance sensor assembly 802 from an external power source such as an external battery, a wall socket, the aerial work platform 130, or some other power source.

Figure 10:
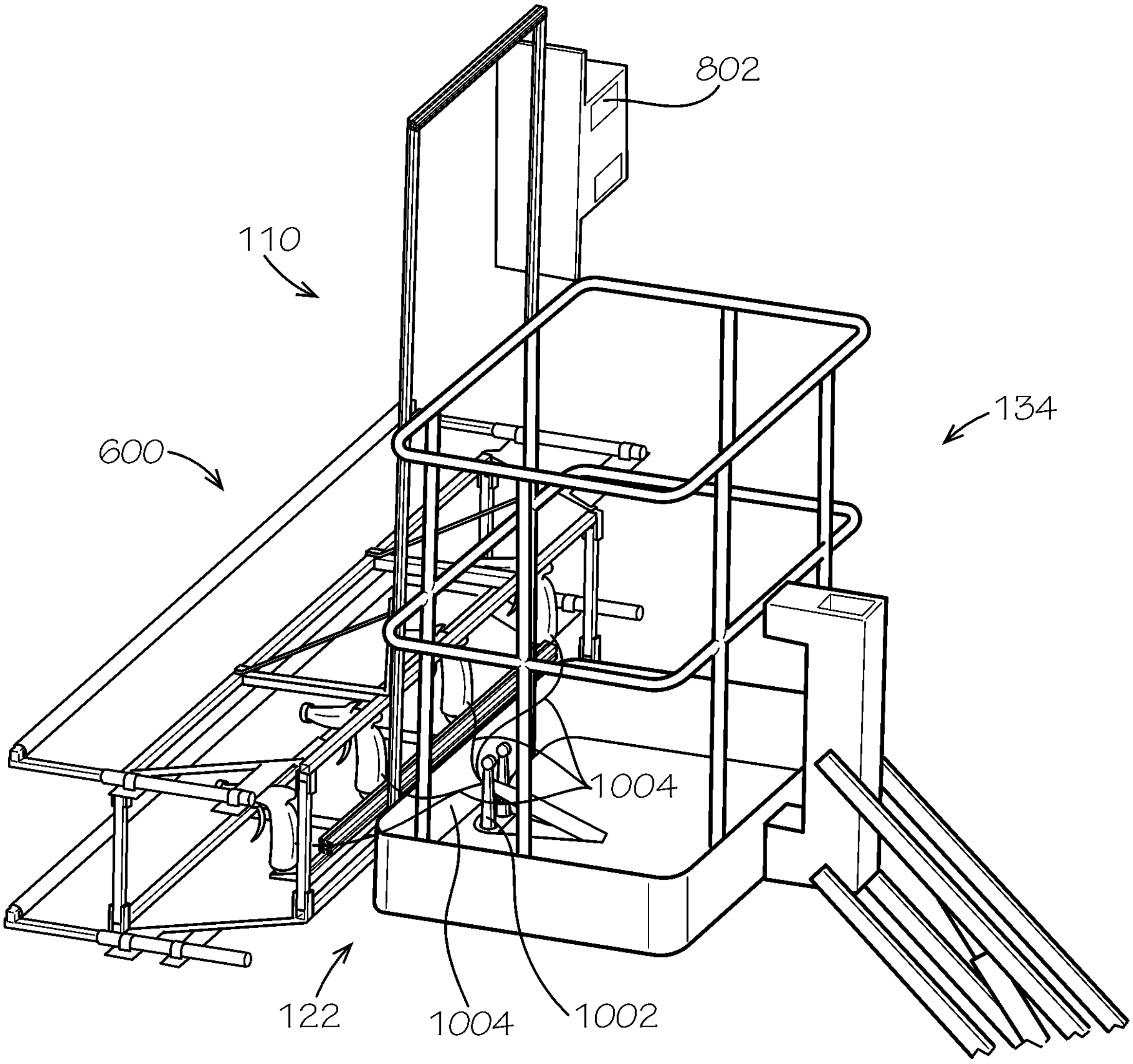
FIG. 10 is a perspective view depicting one embodiment of the paint sprayer array of FIG. 8.

FIG. 10 depicts one embodiment of the paint sprayer array 110 mounted to the basket 134 of the aerial work platform 130, including the shield assembly 600 and the distance sensor assembly 802. The paint sprayer array 110 may include the sprayer activation assembly 122. The sprayer activation assembly 122 may be operable to selectively activate at least a portion of the plurality of sprayers 120.

In one embodiment, the sprayer activation assembly 122 may include a foot pedal 1002. The foot pedal 1002 may connect with a plurality of wires 1004, each wire connecting to one of the sprayers of the plurality of sprayers 120. Each wire may be engaged with a trigger (such as the trigger 404 of FIG. 4) of its associated sprayer. In response to a user pressing down on the foot pedal 1002, the foot pedal 1002 may pull on the plurality of wires 1004, and the plurality of wires 1004 may pull the triggers of the plurality of sprayers 120, which may activate the plurality of sprayers 120. In response to the user lifting up on the foot pedal 1002, the plurality of wires 1004 may cease pulling the triggers of the plurality of sprayers 120 and deactivate the plurality of sprayers 120.

In some embodiments, the activation assembly 122 may include a lever, a button, a dial, or some other control component. In response to a user pulling the lever, pressing the button, turning the dial, or otherwise interacting with a control component of the activation assembly 122, the lever, the button, the dial, or other control component may pull on the plurality of wires 1004 and activate the plurality of sprayers 120. In response to the user ceasing to pull the lever, ceasing to press the button, releasing the dial, or otherwise ceasing to interact with a control component, the plurality of wires 1004 may cease pulling the triggers of the plurality of sprayers 120 and deactivate the plurality of sprayers 120.

In some embodiments, the foot pedal 1002 or other type of control component may include electronic components. In response to the user interacting with the foot pedal 1002 or other type of control component, the electronic components may activate mechanical components that manipulate the plurality of wires 1004. In one or more embodiments, the user ceasing to interact with the foot pedal 1002 or other type of control component may not cause the plurality of sprayers 120 to deactivate. Instead, the user may manipulate the foot pedal 1002 or other control component again to cause the plurality of sprayers 120 to deactivate. For example, in response to the user pressing down on the foot pedal 1002, the plurality of sprayers 120 may activate. The user may remove his or her foot from the foot pedal 1002 and the plurality of sprayers may continue to spray paint. In response to the user pressing down on the foot pedal 1002 a second time, the plurality of sprayers 120 may deactivate. The second action taken by the user may include lifting a lever after pulling it, pressing a button again or pressing a second button, turning a dial back to a previous position, or some other action.

In some embodiments, the modularity of the paint sprayer array 110 (including the shield assembly 600) may allow a user to quickly swap or exchange components of the paint sprayer array 110 in order to clean, perform maintenance, or replace the components. For example, the plurality of sprayers 120 may be swapped out with a second plurality of sprayers 120, and the second plurality of sprayers 120 may have different spray characteristics. The entire array mount 116 may be swapped out for a different array mount 116. The exchangeability of the components of the paint sprayer array 110 may allow for less down time and increased productivity.

Figure 11:
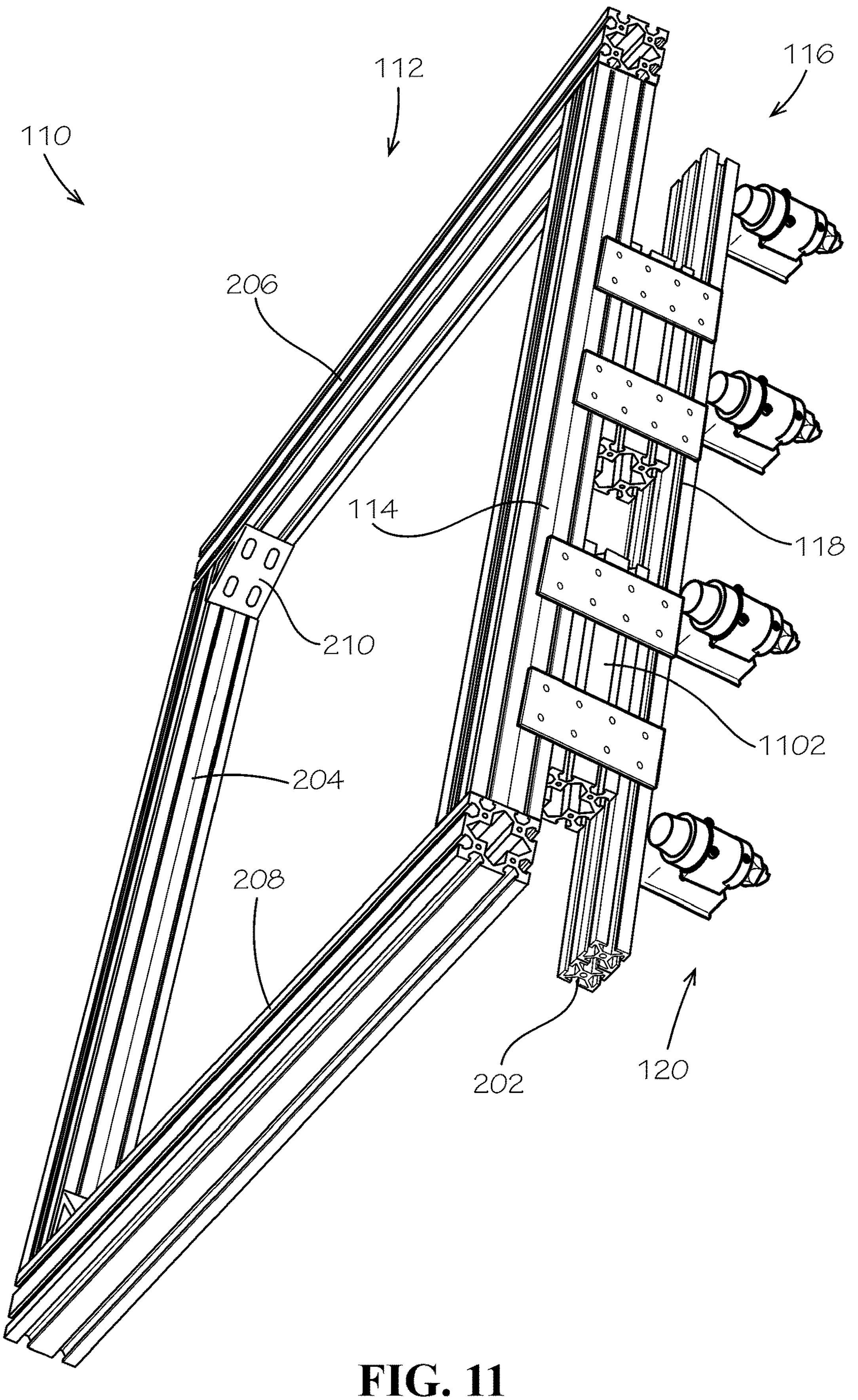
FIG. 11 is a perspective view depicting an another embodiment of a paint sprayer array.

FIG. 11 depicts another embodiment of the paint sprayer array 110. The array mount 116 may include the array support member 118 and a spacer member 1102. The array mount 116 may detachably mount to the array frame 112, and the spacer member 1102 may be positioned between the array frame 112 and the array support member 118. The spacer member 1102 may position the array support member 118 forward and position the plurality of sprayers 120 closer to an object being painted. The spacer member 1102 may allow for the paint sprayer array 110 to operate at a distance from the surface to be painted without risking the array frame 112 coming in contact with incidental objects during operation of the paint sprayer array 110. Also, as can be seen in FIG. 11, the array mount 116 may be disposed vertically. The array support member 118 may detachably mount along the length of the first support member 114 such that the first support member 114 and the array support member 118 are parallel.

Figure 12:
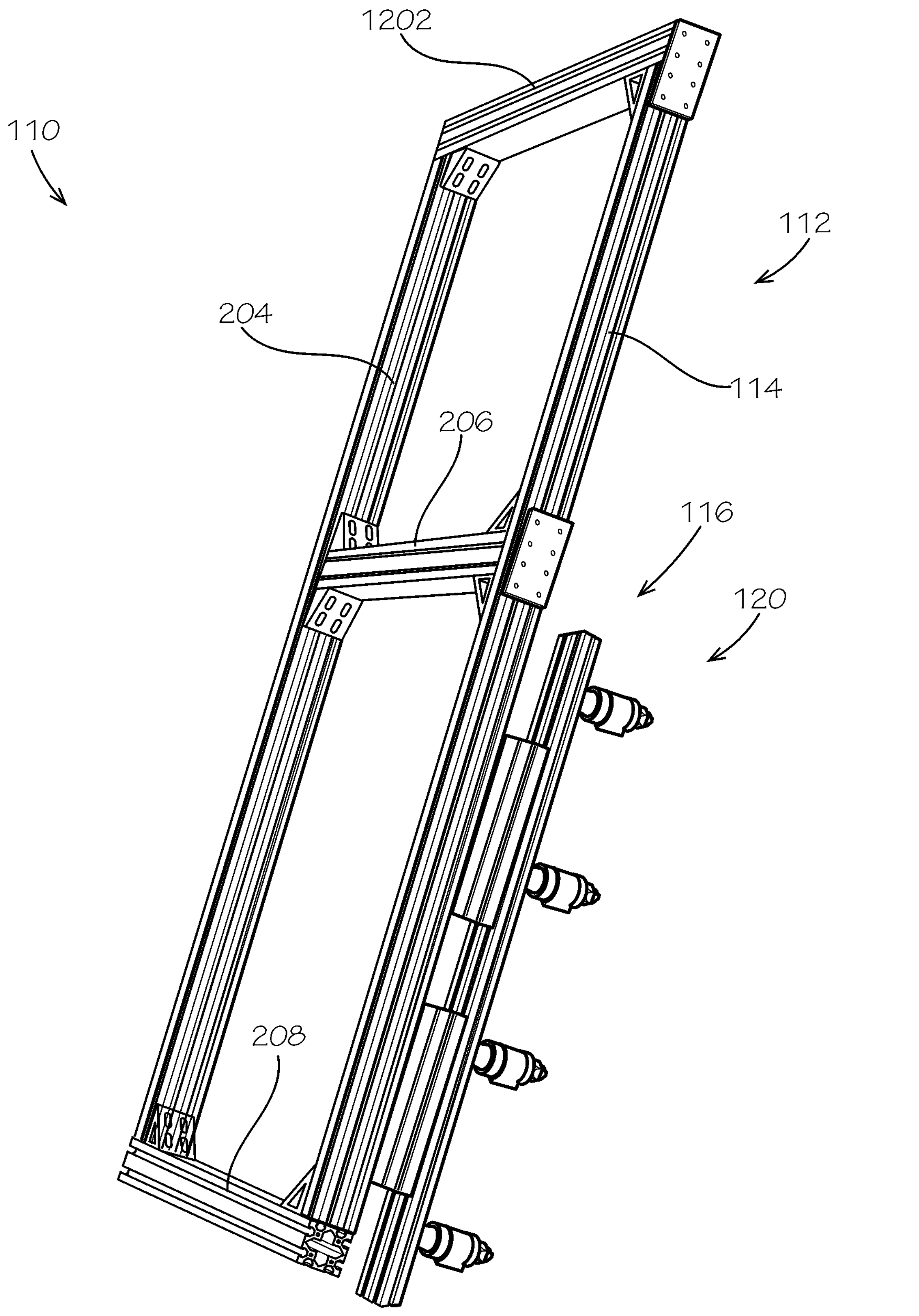
FIG. 12 is a perspective view depicting an alternate embodiment of a paint sprayer array of FIG. 11.

FIG. 12 depicts an alternative embodiment of the paint sprayer array 110. In this embodiment, the array frame 112 may include an additional cross member 1202. This may allow the array frame 112 to be expanded or modified to be configured for various users or environments in which the paint sprayer array 110 is operated.

Figure 13:
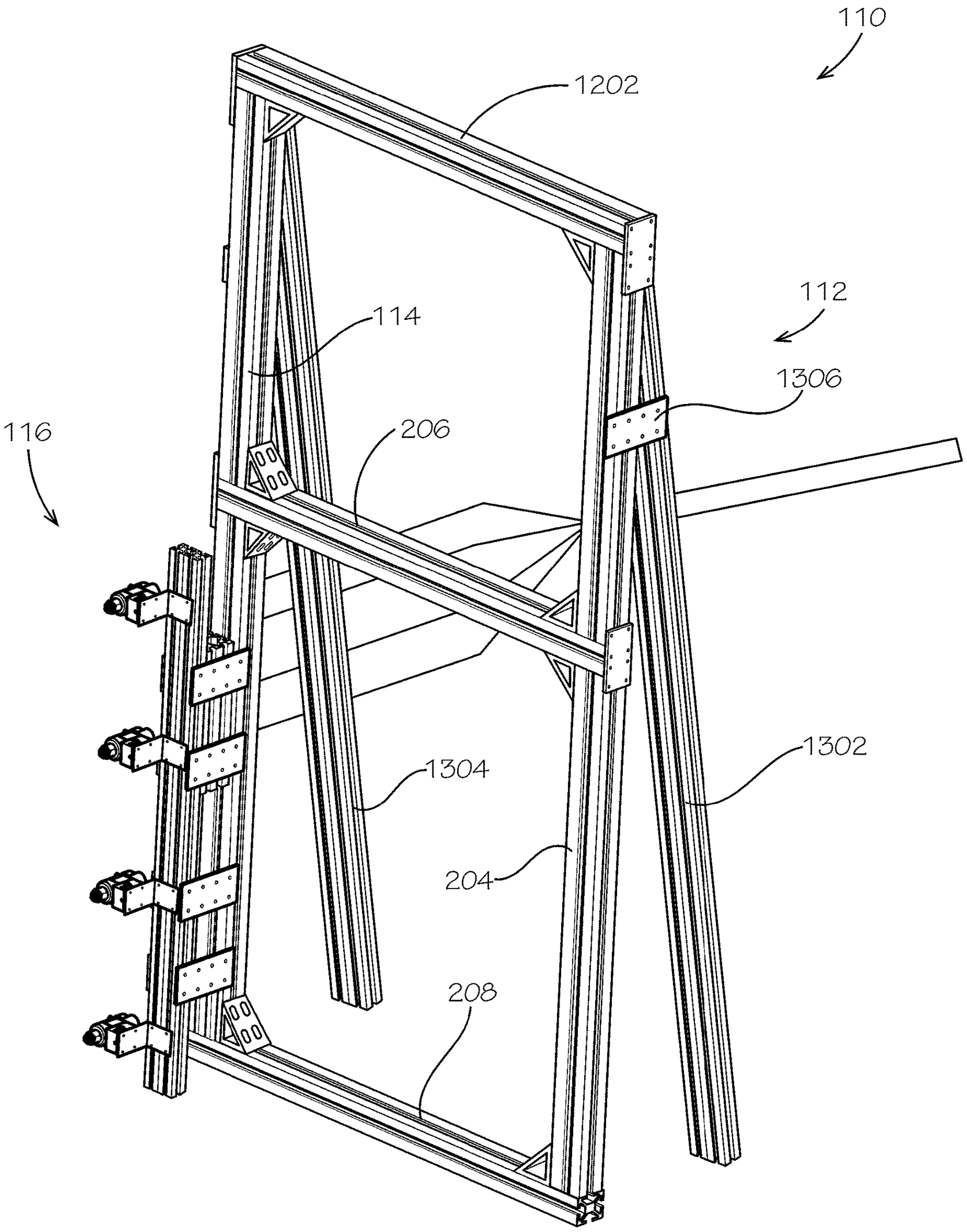
FIG. 13 is a perspective view depicting one embodiment of a modular paint sprayer array including angled back struts.

FIG. 13 depicts one embodiment of the paint sprayer array 110. The array frame 112 may include a first back strut 1302. The back strut 1302 may provide additional stability support to the array frame 112. The first back strut 1302 may extend diagonally from the first support member 114, the second support member 204, the first and second cross members 206, 208, or a combination thereof. As shown in FIG. 13, the array frame 112 may include a first back strut 1302 and a second back strut 1304. The back struts 1302, 1304 may provide stability to the array frame 112 during use. The back struts 1302, 1304 may prevent deflection of the array frame 112 or the plurality of sprayers 120 during use. The array frame 112 may likewise include one or more strut supports 1306. A strut support 1306 may detachably couple to one or more of the back struts 1302, 1304 to the corresponding first or second support member 114, 204.

Figure 14:
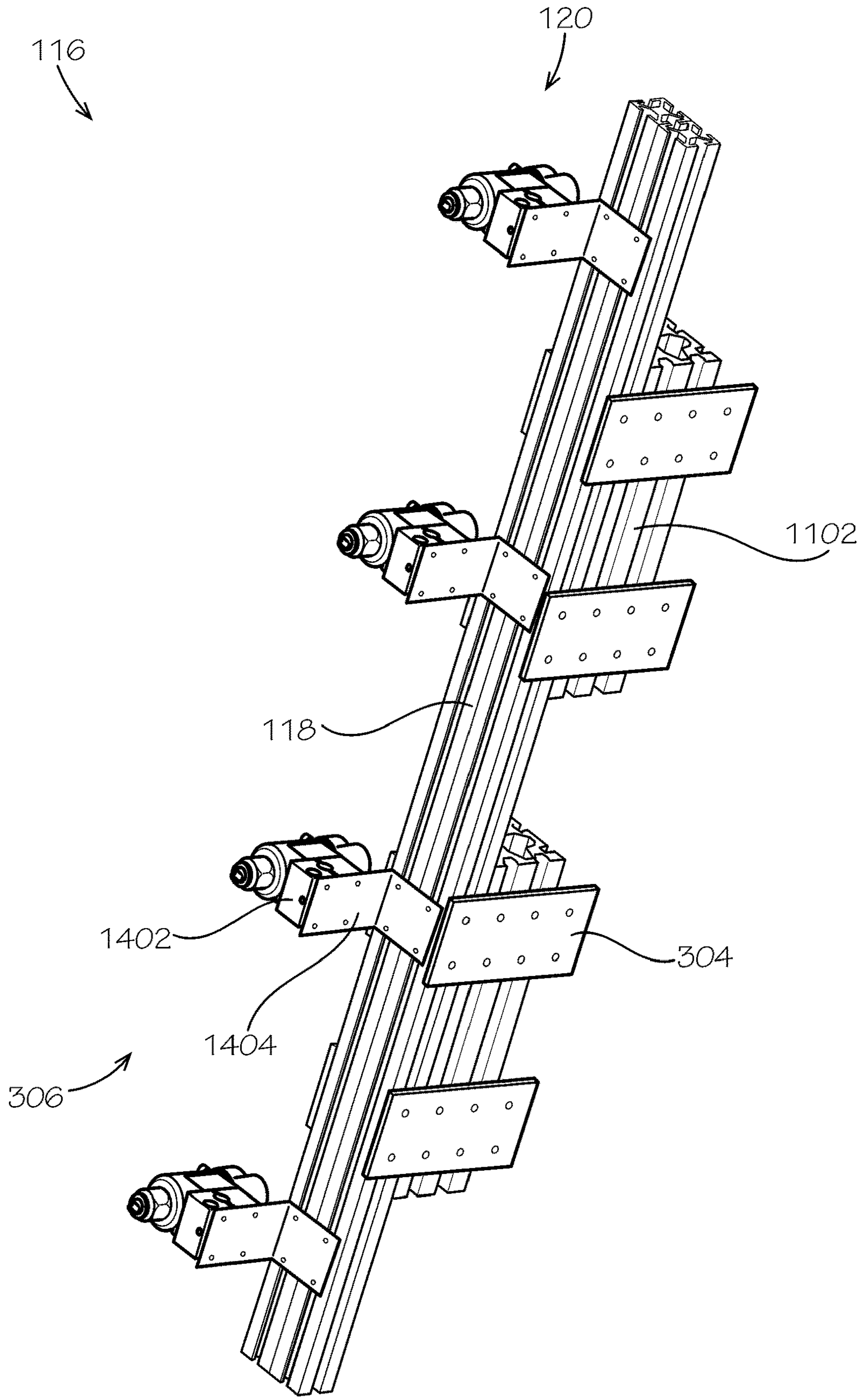
FIG. 14 is a perspective view depicting one embodiment of an array mount of the paint sprayer array included in FIG. 11 with four sprayers evenly spaced relative to each other and along the array support member.

FIG. 14 depicts an alternative embodiment of the array mount 116. The array mount 116 may include the plurality of sprayers 120 detachably coupled to the array support member 118. The plurality of sprayers 120 may be coupled directly to the array support member 118. In other embodiments, the plurality of sprayers 120 are coupled to the array support member 118 via the one or more sprayer mounts 306. In one embodiment, a sprayer mount 306 may include a manifold 1402 and a manifold bracket 1404. Each manifold bracket 1404 may correspond to an individual sprayer of the plurality of sprayer 120. The manifold brackets 1404 may be operable to couple to the array support member 118 in an adjustable coupling. For example, the manifold brackets 1404 may correspond to the fastening slots 202 of the array support member 118. The fastening slots 202 of the array support member 118 may extend the length of the array support member 118 and facilitate a fastener to be used to secure objects to the fastening slots 202. For example, a nut, bolt, and washer may be implemented as fasteners in connection with the fastening slots 202. When the manifold brackets 1404 are positioned with respect to each other, the manifold brackets 1404 may be secured to the array support member 118. The adjustable positions of the manifold brackets 1404 may also be possible for the plurality of sprayers 120 when the plurality of sprayers 120 are coupled directly to the array support member 118.

Figure 15:
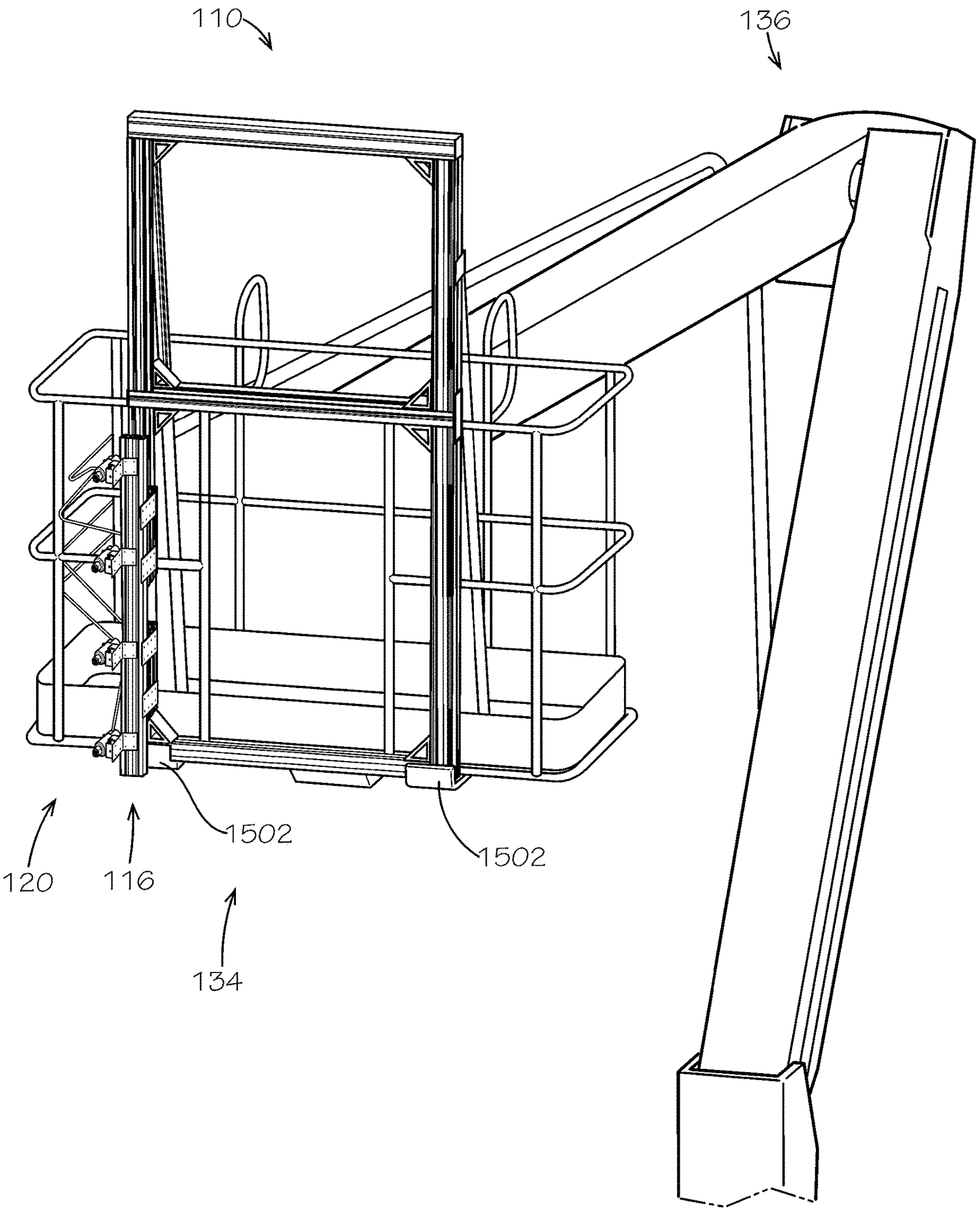
FIG. 15 is a perspective view depicting an embodiment of the paint sprayer array of FIG. 13 on the basket of the aerial work platform.

FIG. 15 depicts one embodiment of the paint sprayer array 110 detachably mounted on the basket 134 of the aerial work platform 130. The basket 134 may include a securing portion 1502 for securing the paint sprayer array 110 to the basket. The securing portion 1502 may be positioned on the basket 134 in order to secure the array frame 112 in a position such that the plurality of sprayers 120 and the array mount 116 are oriented outward relative to the basket 134. The floor of basket 134 may be generally operable to remain horizontal even when the extension member 136 may reposition or otherwise move. Thus, the securing portion 1502 of the basket 134 may be operable to position the array frame 112 of the paint sprayer apparatus 110 transverse relative to the floor of the basket 134. The array frame 112 being positioned transverse relative to the floor may include the array frame 112 being perpendicular to the floor. In other words, the extension member 136 may maintain the array frame 112 or the array mount 116 in an orientation that may be parallel with the surface being painted. The array mount 116 may be mounted on the array frame 112 in various positions, including on the first and second support members 114, 204 or the first and second cross members 206, 208.

Figure 16:
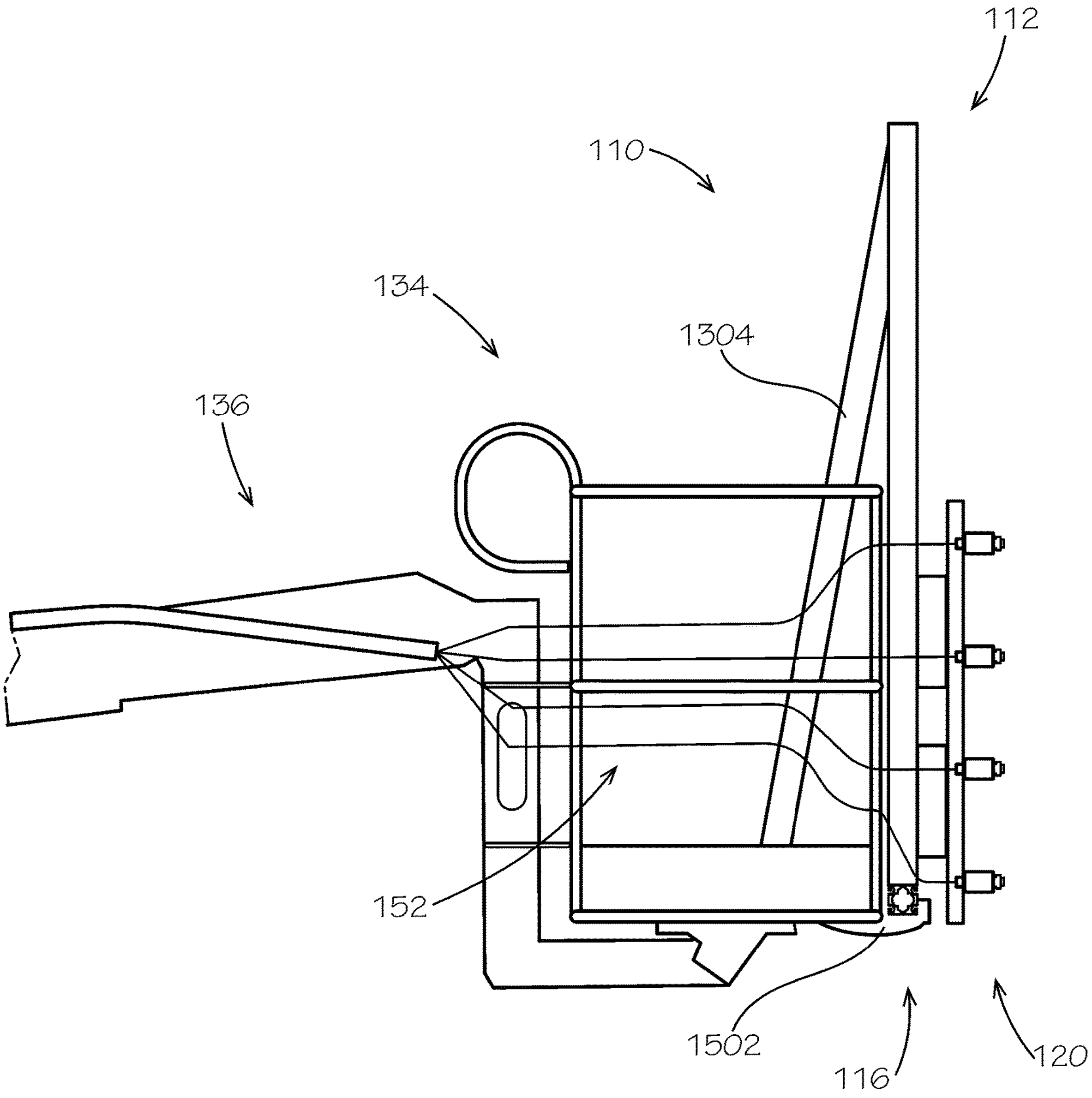
FIG. 16 is a side view depicting one embodiment of the paint sprayer array on the basket of the aerial work platform depicted in FIG. 15.

FIG. 16 depicts one embodiment of the paint sprayer array 110 detachably mounted on the basket 134 of the aerial work platform 130. The array frame 112 may include the back struts 1302, 1304 for providing additional stability to the array frame 112 while mounted on the basket 134. For example, the diagonal back struts 1302, 1304 may be angled from a top portion of the array frame 112 such that the distal ends of the back struts 1302, 1304 contact the floor of the basket 134. The array frame 112 may also be supported by the securing portion 1502. The securing portion 1502 may extend from the basket 134. Other securing points (e.g., the one or more hooks 310 of FIGS. 3A-B) may be implemented to further support and secure the paint sprayer array 110 to basket 134 or other area of the aerial work platform 130.

Figure 17:
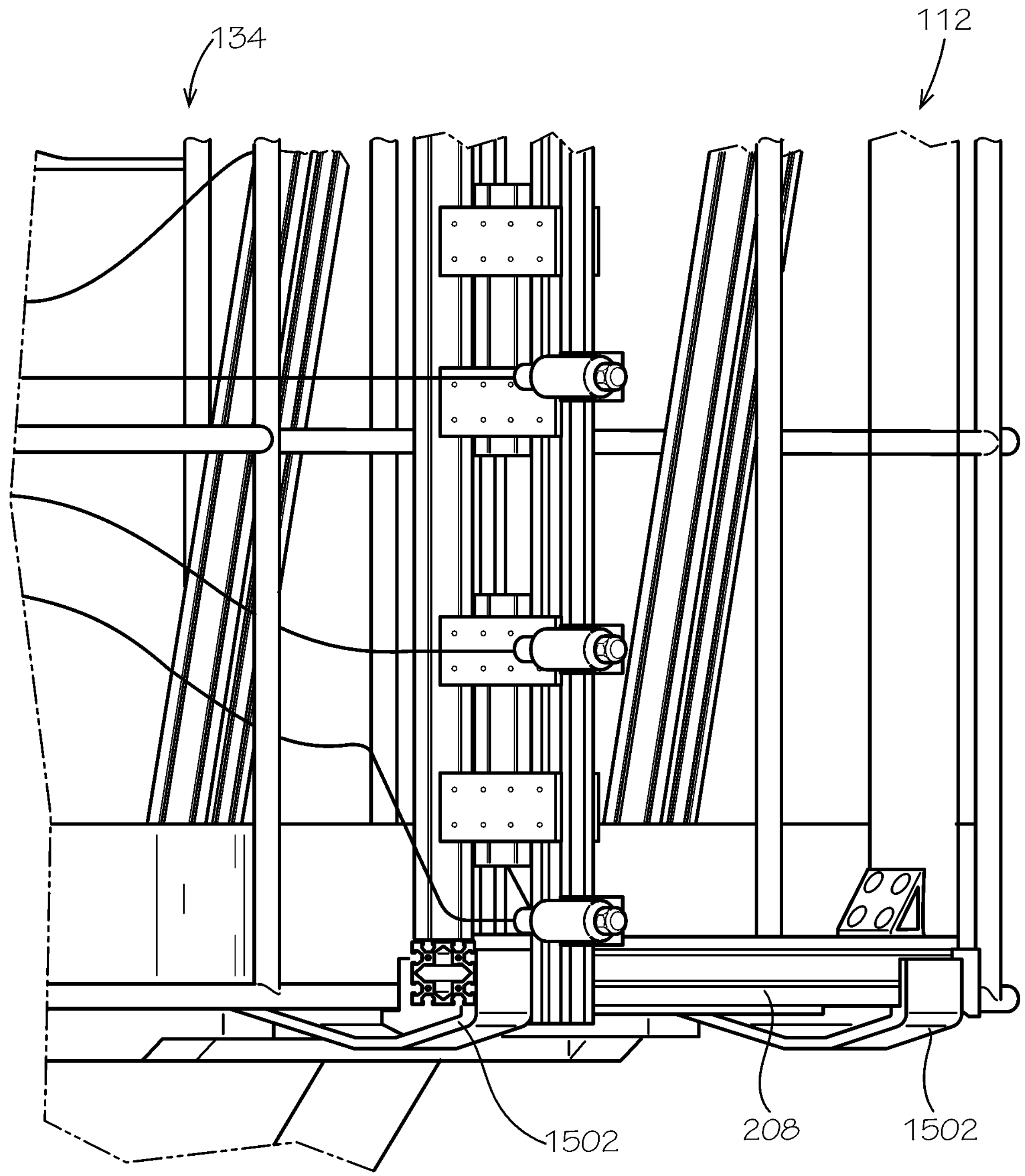
FIG. 17 is a perspective view depicting an embodiment of a securing portion of the basket included in FIG. 15.

FIG. 17 depicts a portion of the paint spray apparatus 110 detachably mounted to the basket 134 of the aerial work platform 130. The basket 134 may include the securing portion 1502. The securing portion 1502 may help the array frame 112 detachably mount to the basket 134. For example, as depicted in FIG. 17, the securing portion 1502 may include one or more concave pieces of rigid material disposed on a lower portion of the basket 134. The rigid material may engage with the second cross member 208 of the array frame 112 and support the array frame 112. In some embodiments, as is depicted in FIG. 17, the securing portion 1502 may include a U-shaped piece of material disposed on the lower portion of the basket 134 that holds the second cross member 208.

Figure 18:
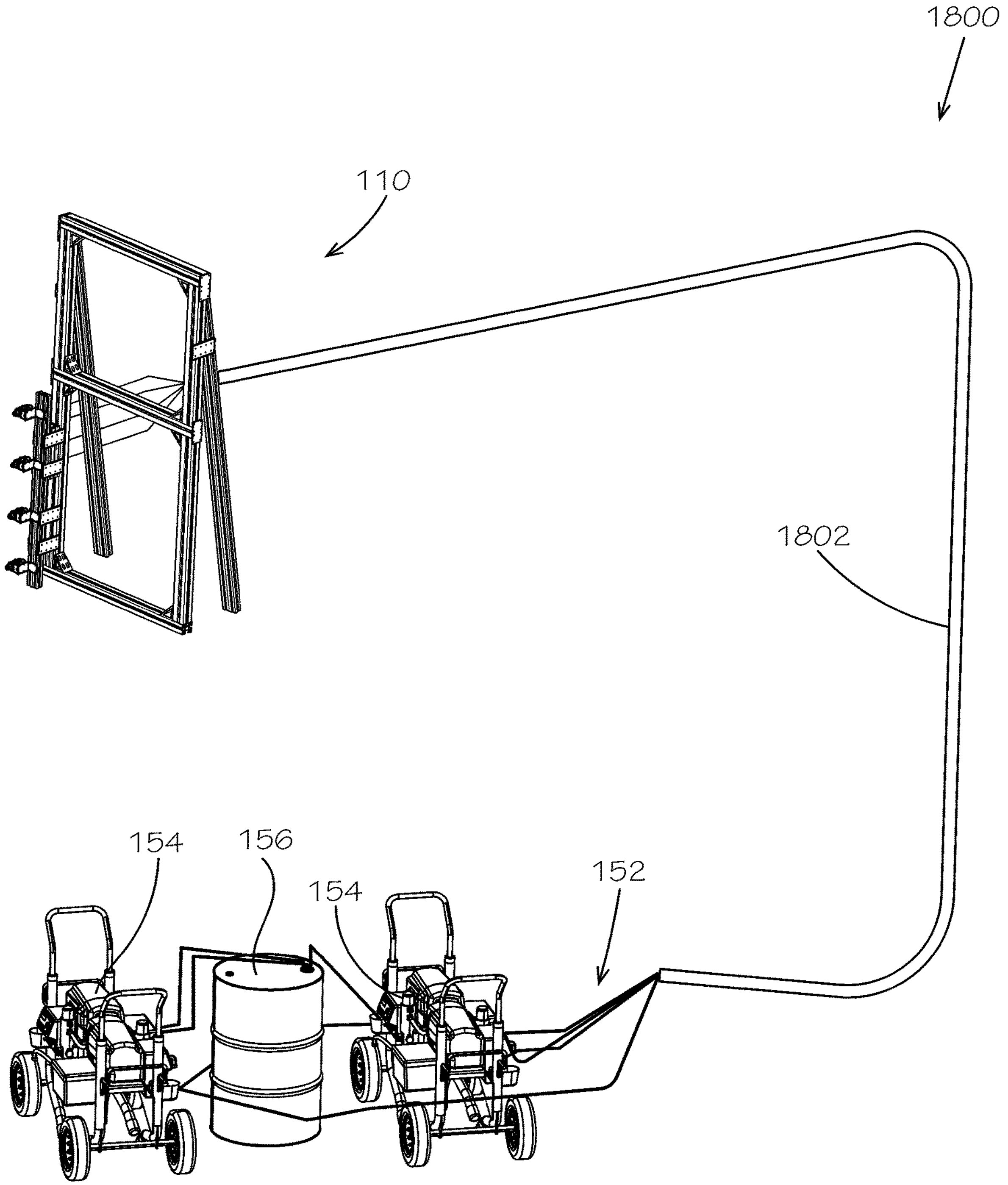
FIG. 18 is a perspective view depicting one embodiment of a paint sprayer apparatus.

FIG. 18 depicts one embodiment of an apparatus 1800. The apparatus 1800 may include a paint spraying apparatus. The apparatus 1800 may include the paint sprayer 110 array. The apparatus 1800 may include the plurality of hoses 152. Each hose of the plurality of hoses 152 may be in fluid communication with a corresponding sprayer of the plurality of sprayers 120. The apparatus 1800 may include the pump 154. Each hose of the plurality of hoses 152 may be in fluid communication with the pump 154. The apparatus 1800 may include a paint supply 156. The paint supply 156 may be in fluid communication with the pump 154.

In one embodiment, the apparatus 1800 may include a 1802. The sheath 1802 may be disposed around the plurality of hoses 152. The plurality of hoses 152 may be housed in the sheath 1802. The sheath 1802 may provide protection to the plurality of hoses 152. The sheath 1802 may help organize the plurality of hoses 152. The sheath 1802 may allow for the plurality of hoses 152 to all be contained within a small area to prevent tangling, kinking, wrapping around unintended objects.

The pump 154 may be operable to receive paint from the paint supply 156. The pump 154 may be operable to send the received paint to the plurality of sprayers 120 via the plurality of hoses 154. The pump 154, in some embodiments, may include a paint pump, an air compressor, a suction hose, or other fluid-moving components.

The paint supply 156 may include a barrel, a bucket, a drum, a can, or some other suitable container for holding paint. The pump 154 may extract the paint from the paint supply 156 and feed the plurality of sprayers 120 via the plurality of hoses 152. In some embodiments, a single pump 154 may be operable to supply paint to each of the plurality of sprayers 120. In other embodiments, as depicted in FIG. 18, the apparatus 1800 may include multiple pumps. A first pump 154 may supply paint to a portion of the plurality of sprayers 120, and a second pump 154 may supply paint to the remaining plurality of sprayer 120. In other embodiments, each sprayer of the plurality of sprayers 120 may be supplied with paint by a corresponding pump 154.

In some embodiments, the plurality of hoses 152 may include a single hose that detachably couples to the pump 154 at a first end and divides into a plurality of sub-hoses at an opposite second end. Each sub-hose may detachably couple to a sprayer of the plurality of sprayer 120. The pump 154 may pump paint into the first end of the hose, and the paint may split into separate streams that travel through the sub-hoses.

Figure 19:
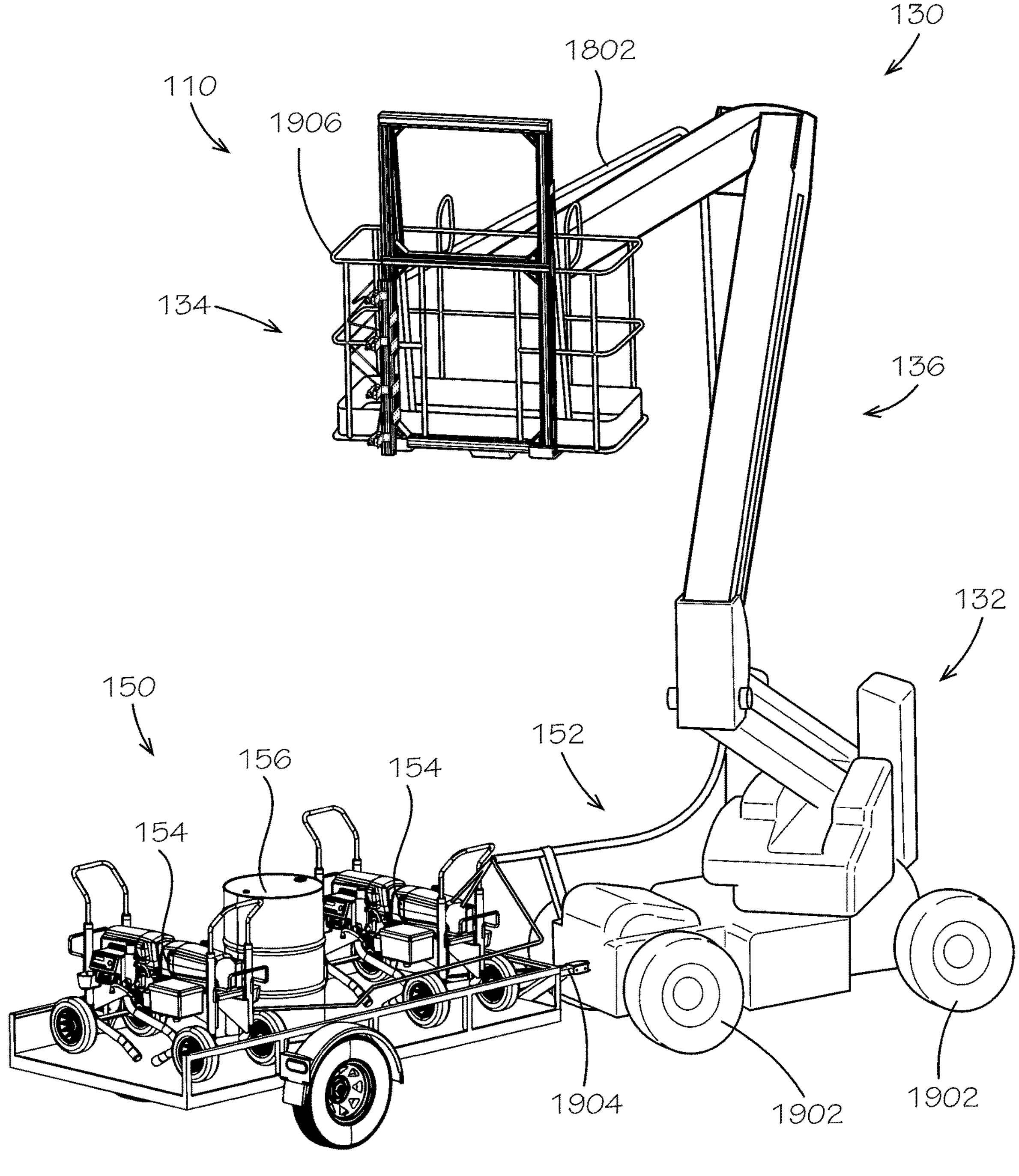
FIG. 19 is a perspective view depicting one embodiment of a modular paint spraying system.

FIG. 19 depicts various components of the system 100 of FIG. 1 such as the paint sprayer array 110, the aerial work platform 130, and the trailer 150. The aerial work platform 130 may be detachably coupled to the trailer 150. In some embodiments, the plurality of hoses 152 extending between the pump 154 to the plurality of sprayers 120 may be positioned and secured along a portion of the aerial work platform 130 such that the plurality of hoses 152 run from the mobile base 132, along the extension member 136, and to the basket 134. The plurality of hoses 152 may be housed in the sheath 1802, which may be detachably coupled to the portions of the aerial work platform 130. In some embodiments, portions of the sheath 1802 may be disposed on components of the system 100. For example, the extension member 136 of the aerial work platform 130 may include one or more hooks that the sheath 1802 may rest on, or the extension member 136 may include one or more loops that the sheath 1802 may extend through. These hooks, loops, or other components may move the sheath 1802 as the extension member 136 moves and keep the sheath 1802 from becoming tangled in the extension member 136.

The aerial work platform 130 may include a cherry picker lift (as is depicted in FIG. 19), a scissor lift, a hotel lift, a telescoping lift, a hydraulic lift, a forklift, an articulating boom lift, a boom crawler, a vertical mast lift, or some other type of aerial work platform. The mobile base 132 may include one or more movement assemblies 1902 such as wheels, treads, or other mechanisms used to move the mobile base 132. The mobile base 132 may include a hitch 1904 or other mechanism operable to detachably couple the trailer 150 to the mobile base 132.

The basket 134 of the aerial work platform 130 may include the railing 312. The railing 312 may include one or more bars of rigid material that extend upward from floor of the basket 134 or are disposed around an area above the basket 134. The railing 312 may prevent a user located in the basket 134 from falling out of the basket 134. A portion of the paint sprayer array 110 (such as the one or more hooks 310 of FIGS. 3A-B) may detachably couple to a portion of the railing 312, and the railing 312 may support the paint sprayer array 110 on the basket 134. The basket 134 may include a control panel. The control panel may be operable to move the basket 134 relative to the mobile base 132. For example, the control panel may raise or lower the basket 134, translate the basket 134 in a horizontal plane, or may cause the basket 134 to perform other movements.

The extension member 136 may include an articulated arm (as is depicted in FIG. 19), a scissor mechanism, a telescoping arm, or some other type of mechanism operable to move the attached basket 134 relative to the mobile base 132. The extension member 136 may include various movement components such as hydraulics, pivots, hinges, telescoping booms, or other movement components. The control panel of the basket 134, a control panel disposed on the mobile base 132, or a remote control panel wireless communicated with the aerial work platform 130 may be operable to control the movement components of the extension member 136.

Figure 20A:
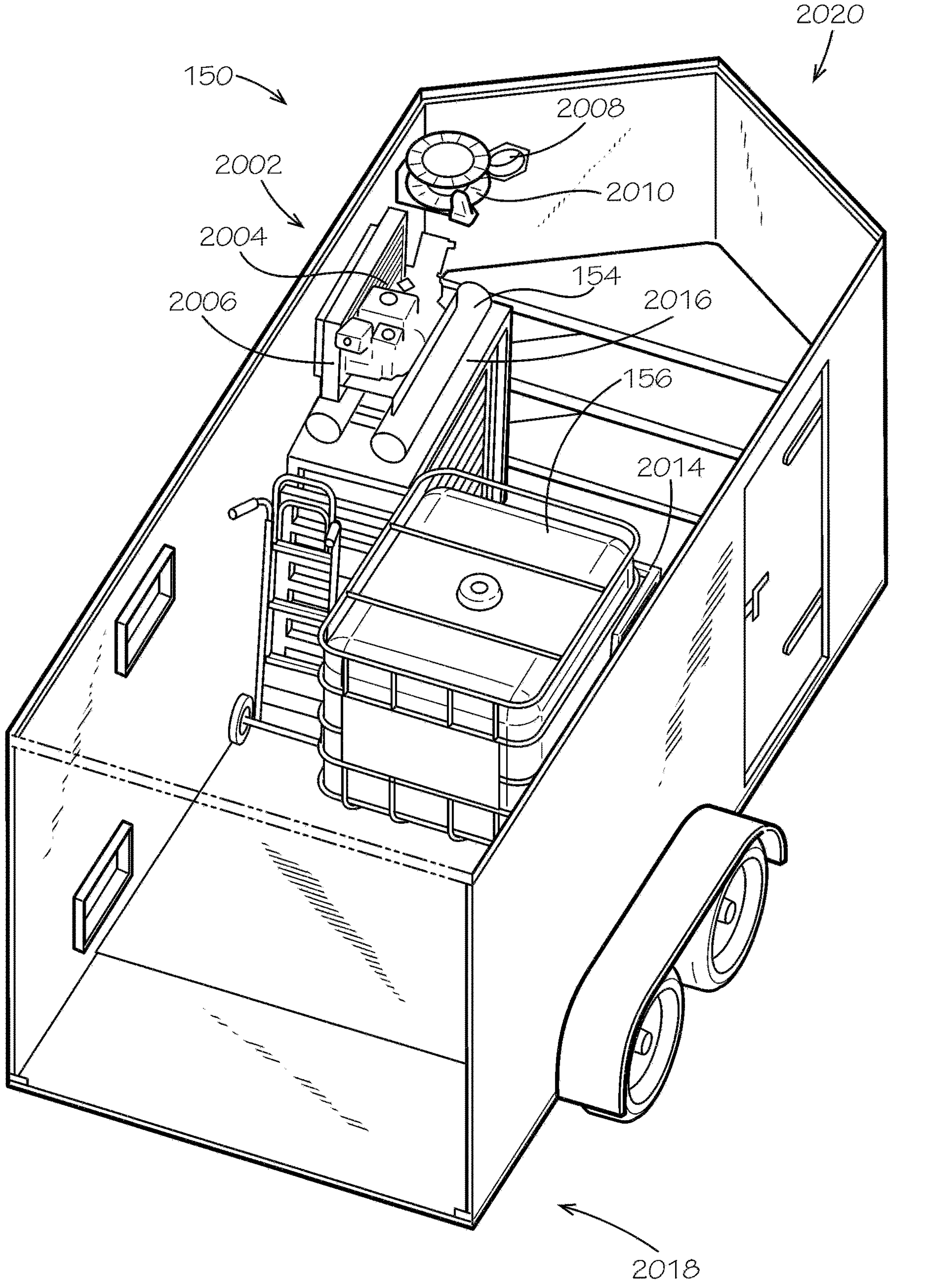
FIG. 20A is a perspective view depicting one embodiment of the trailer with the roof removed.
Figure 20B:
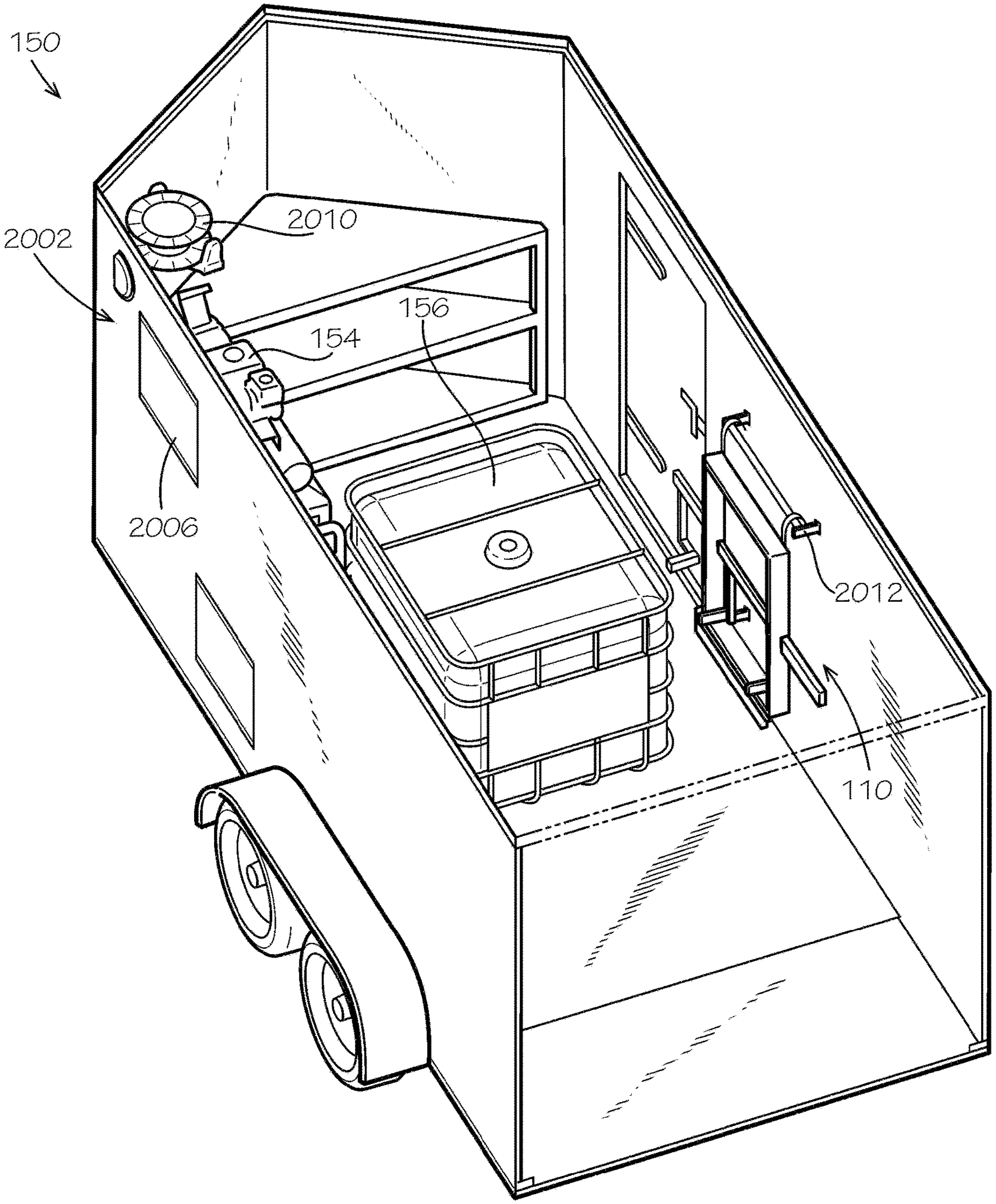
FIG. 20B is a perspective view depicting the trailer of FIG. 20A at a different angle.

FIG. 20A and FIG. 20B depict various views of one embodiment of the trailer 150. The trailer 150 may transport components of the system 100 to the job site where the system 100 is to be used. The size, dimensions, and layout of the trailer 150 may allow one or more users to quickly set up or take down the components of the system 100. The trailer 150 may detachably couple to the aerial work platform 130 and may allow various components on the trailer 150, such as the pump 154 or the paint supply 156, to be pulled by the aerial work platform 130 as the aerial work platform 130 moves about during the painting job.

Generally, the trailer 150 may include a floor, one or more sides, a roof, wheels, a trailer coupler, and an entrance. In one embodiment, the trailer 150 may include a ventilation assembly 2002. The ventilation assembly 2002 may include a ventilation hose 2004. The ventilation hose 2004 may be detachably coupled to the pump 154. The ventilation assembly 2002 may include a vent box 2006. The vent box 2006 may be disposed in a side of the trailer 150. The ventilation hose 2004 may detachably coupled to the vent box 2006. The ventilation assembly 2002 may transfer exhaust from the pump 154 to outside the trailer 150 via the ventilation hose 2004.

In some embodiments, the trailer 150 may include a hose aperture 2008. The hose aperture 2008 may be disposed in a side of the trailer 150. The trailer 150 may include a hose reel 2010. The plurality of hoses 152 may be coiled around the hose reel 2010. The plurality of hoses 152 may extend out of the trailer 150 via the hose aperture 2008. The hose reel 2010 may include one or more rotational mechanisms that may allow the plurality of hoses 152 to reel off of the hose reel 2010 and reel back onto the hose reel 2010. In some embodiments, in response to tension created by a user pulling on the plurality of hoses 152, the hose reel 2010 may rotate and unwind the plurality of hoses 152. In response to a loss of the tension, the hose reel 2010 may automatically wind the plurality of hoses 152 back up.

In one or more embodiments, the trailer 150 may include one or more equipment mounts. Various components of the system 100 may be detachably mountable or disposable on an equipment mount. An equipment mount may include a rack 2012. The rack 2012 may be disposed on a wall of the trailer 150, as is depicted in FIG. 20B. The paint sprayer array 110 may be detachably mountable on the rack 2012. The rack 2012 may be sized, shaped, and positioned on the trailer for the paint sprayer array 110 to mount to while the paint sprayer array 110 is not in use. When the paint sprayer array 110 is mounted to the rack 2012, the array mount 116 may still be mounted to the array frame 112. In some embodiments, the array mount 116 may selectably mount to a second rack 2012 or another equipment mount that is separate from the rack 2012 for holding the paint sprayer array 110.

In some embodiments, the trailer 150 may include one or more securing members. A securing member may include a structure that prevents movement of components of the system 100 while those components are disposed inside the trailer 150. A securing member may include a railing 2014 disposed around a component, such as the paint supply 154, as is depicted in FIG. 20A. The railing 2014 may be of a variety of heights. The railing 2014 may include an adjustable height (e.g., the railing 2014 may include one or more telescoping members). A securing member may include an upper surface 2016. The upper surface 2016 may be disposed on the railing 2014, a wall of the trailer 150, or at some other location in the trailer 150. The upper surface 2016 may prevent components disposed under the upper surface 2016 from translating in an upward direction. In one embodiment, as is depicted in FIGS. 20A-B, the pump 154 may be mounted to the upper surface 2016. In other embodiments, the pump 154 may be detachably mounted to the floor or wall of the trailer 150 or some other portion of the trailer 150.

The trailer 150 may include a ramp. The ramp may be disposed on the backside 2018 of the trailer 150. The backside 2018 may be disposed opposite the front side 2020 of the trailer. The backside 2018 may include the rear of the trailer 150 when the trailer 150 is towed. In one embodiment, the ramp may fold down from the backside of the trailer 150, and when the ramp is in a folded-up position, the ramp may close an entrance to the trailer 150. In other embodiments, the ramp may extend outward from the trailer 150 and may not be part of a door of the trailer 150. The ramp may allow for components, such as the pump 154 or the paint supply 156 to be wheeled onto the trailer 150.

The trailer 150 may include an electric power hook-up. The hook-up may receive electrical power from an external power source such as a generator, wall socket, or other power source. The hook-up may supply electrical power to one or more electrical sockets inside the trailer 150. Various components of the system 100, such as the pump or the air compressor, may plug into the electrical sockets and receive power. The trailer 150 may include an external paint gauge. The external paint gauge may be disposed on an outside wall of the trailer 150. The external paint gauge may indicate the amount of paint remaining in the paint supply 156. In one embodiment, the external paint gauge may include a window and a transparent or translucent paint supply 156 may be disposed next to the window such that a user can see the level of paint remaining in the paint supply 156 through the window. In another embodiment, the external paint gauge may use a weight of the paint supply or a float disposed inside the paint supply when indicating the amount of paint remaining in the paint supply 156. In some embodiments, the trailer 150 may include one or more light sources mounted inside the trailer 150. The trailer 150 may include one or more lights sources mounted outside the trailer 150.

The trailer 150 may include a trailer coupler. The trailer coupler may be disposed on the outside of the trailer at the front side 2020 of the trailer. The trailer coupler may be disposed on the front side 2020 at a position and height such that the trailer coupler can detachably couple to a hitch, such as the hitch of a truck that can tow the trailer 150. The trailer 150 may include a jack. The jack may be disposed near the trailer coupler and may adjust the height of the trailer coupler relative to the ground. The trailer coupler may include a socket for a ball hitch or some other type of trailer coupler.

Figure 21A:
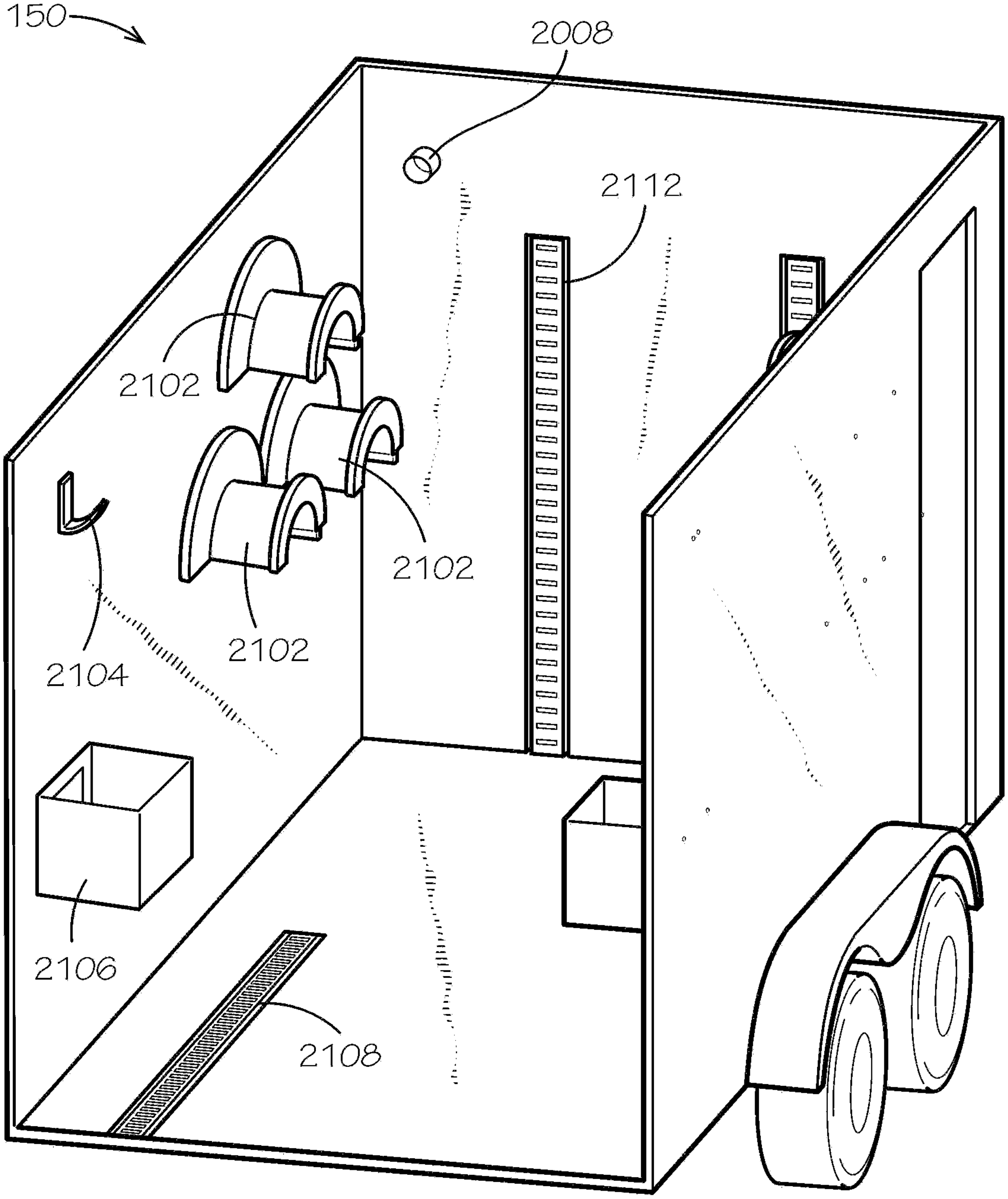
FIG. 21A is a perspective view depicting another embodiment of the trailer with the roof and back removed.
Figure 21B:
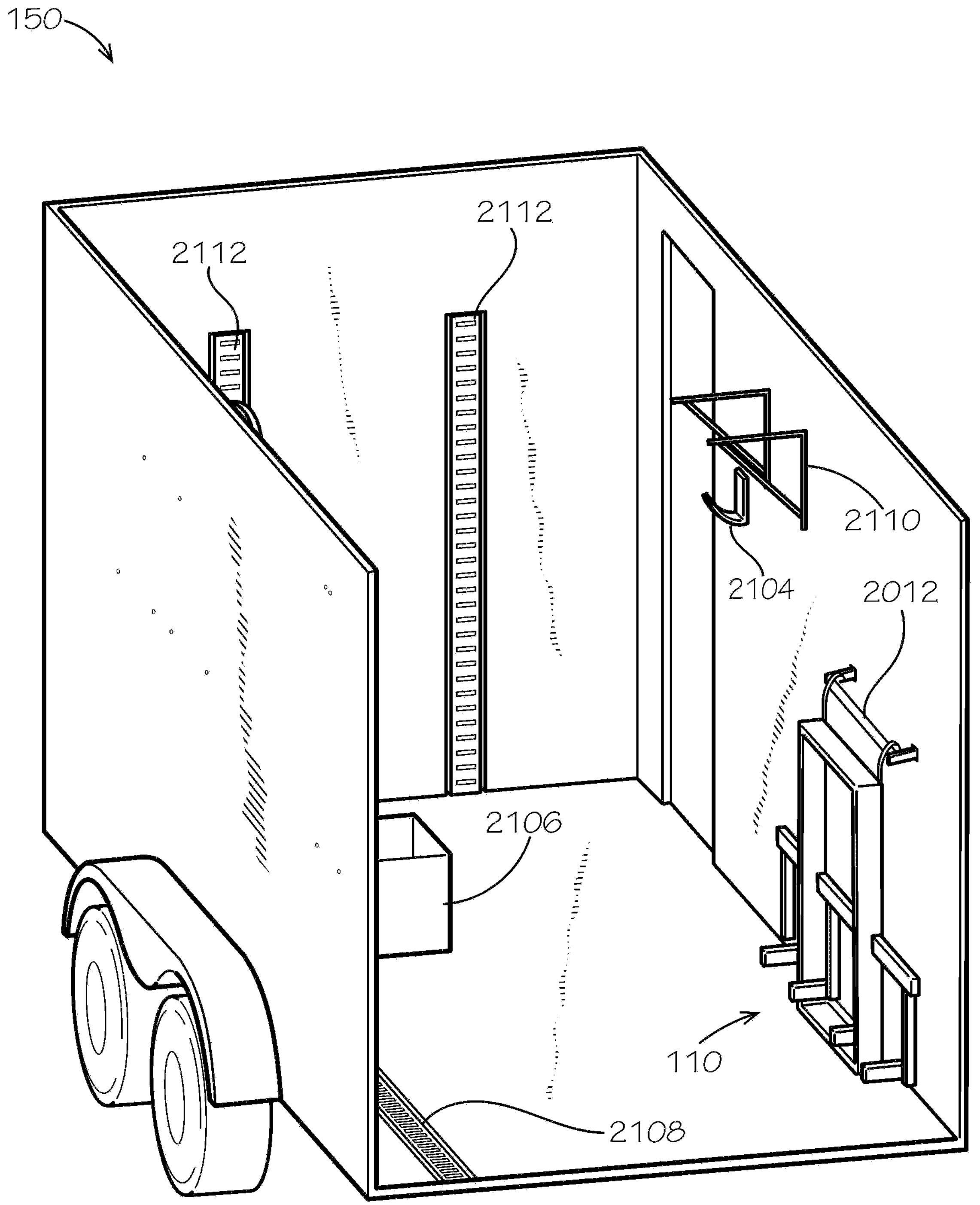
FIG. 21B is a perspective view depicting the trailer of FIG. 21A.

FIG. 21A and FIG. 21B depict various views of another embodiment of the trailer 150. The trailer 150 depicted in FIGS. 21A-B may include one or more components of the trailer 150 depicted in FIGS. 20A-B, such as a floor, one or more sides, a roof, wheels, a trailer coupler, an entrance, a ramp, or other components. The trailer of FIGS. 21A-B may include one or more components of the trailer 150 discussed in relation to FIGS. 20A-B, although not depicted or discussed here.

The trailer 150 may include the one or more equipment mounts. An equipment mount may include one or more hose mounts 2102. A hose mount 2102 may include a curved member extending away from a wall of the trailer 150. The curved member may include a semi-circle (as is depicted in FIG. 21A), a circle, an oval, or some other curved shape that a coiled-up hose (such as a hose of the plurality of hoses 152) may detachably mount on. The hose mount 2102 may include a first flange disposed on a first end of the curved member. The first flange may be disposed against a wall of the trailer. The first flange may provide a location for one or more fasteners to fasten the hose mount 2102 to the wall. The hose mount 2102 may include a second flange disposed on a second end of the curved member that is disposed opposite the first end. The second flange may prevent a hose that is detachably mounted on the hose mount 2012 from slipping off the hose mount 2102.

The one or more equipment mounts may include one or more hooks 2104. A hook 2104 may be mounted to a wall of the trailer 150. A hook 2104 may detachably hold one or more components of the system 100. For example, a hook may hold one or more hoses of the plurality of hoses 150, the sheath 1802, the paint sprayer array 110 (or a component thereof), or some other component. An equipment mount may include one or more containers 2106. A container 2106 may store various components of the system 100 such as the plurality of sprayers 120, the distance sensor assembly 802, the sprayer activation assembly 122, or other components. The container 2106 may be disposed in various locations in the trailer 150. For example, the container 2106 may be disposed on a wall of the trailer 150 (as depicted in FIG. 21A), under the upper surface 2016, on the floor, or in some other location.

A securing member of the trailer 150 may include one or more floor securing members 2108. The floor securing member 2108 may include a cargo bar. The cargo bar may include an e-track bar. The cargo bar may include a strip of material (such as metal) with a plurality of slots. A strap may insert through a slot of the cargo bar and secure down equipment. For example, a strap may be disposed over the paint supply 156 or through a space in the frame of the paint supply 156 in order to secure the paint supply 156 and prevent the paint supply 156 from translating on the floor of the trailer 150. The floor securing member 2108 may be disposed on the floor longitudinally (as depicted in FIG. 21A), laterally, or at an angle.

FIG. 21B depicts an equipment mount in the form of the rack 2012. The rack 2012, as depicted in FIG. 21B, may detachably hold the paint sprayer array 110 (or a component thereof). In some embodiments, the trailer 150 may include other racks 2012 for holding the shield assembly 600 (or components thereof). The trailer 150 may include a pair of brackets 2110. The brackets 2110 may include L-shaped brackets mounted to the wall of the trailer 150. One or more components of the system 100 may detachably mount on the brackets 2110.

The securing members of the trailer 150 may include one or more wall securing members 2112. A wall securing member 2112 may include a similar structure to the floor securing member 2108, but the wall securing member 2112 may be disposed on a wall of the trailer 150. A wall securing member 2112 may be disposed on the wall vertically (as depicted in FIG. 21B), horizontally, or at an angle.

Figure 22A:
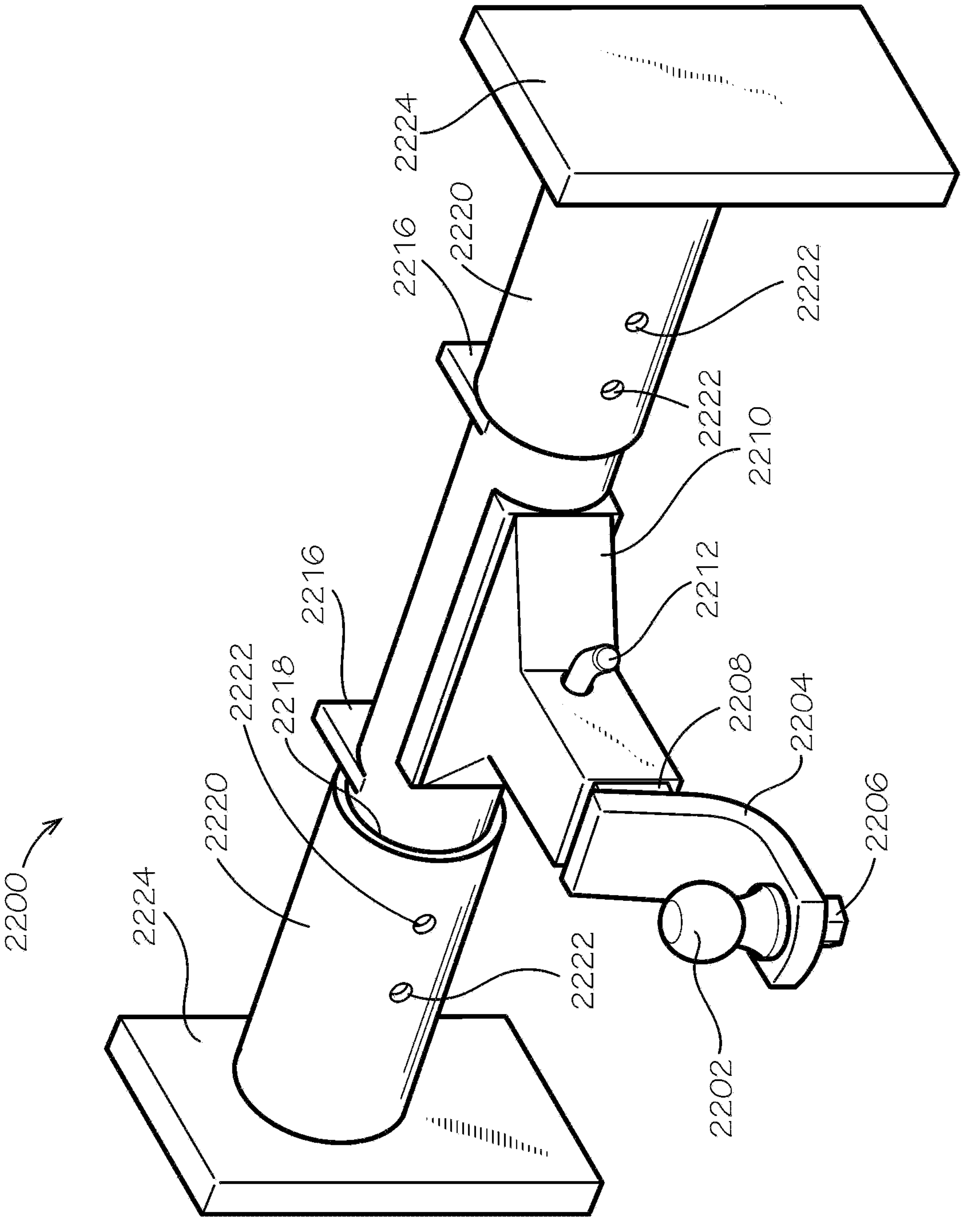
FIG. 22A is a perspective view depicting one embodiment of a trailer hitch adapter.
Figure 22B:
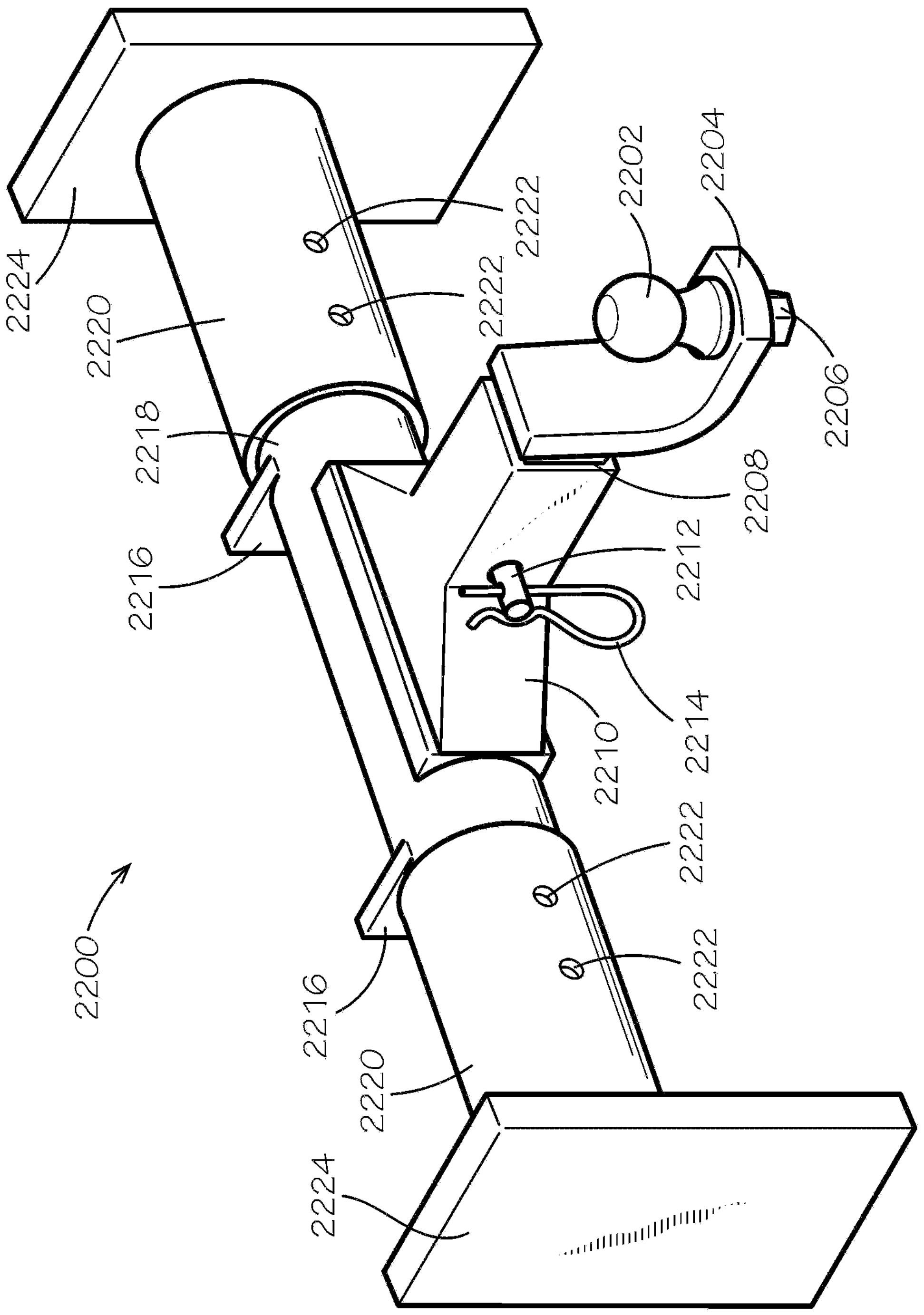
FIG. 22B is a perspective view depicting the trailer hitch adapter of FIG. 22A.
Figure 22C:
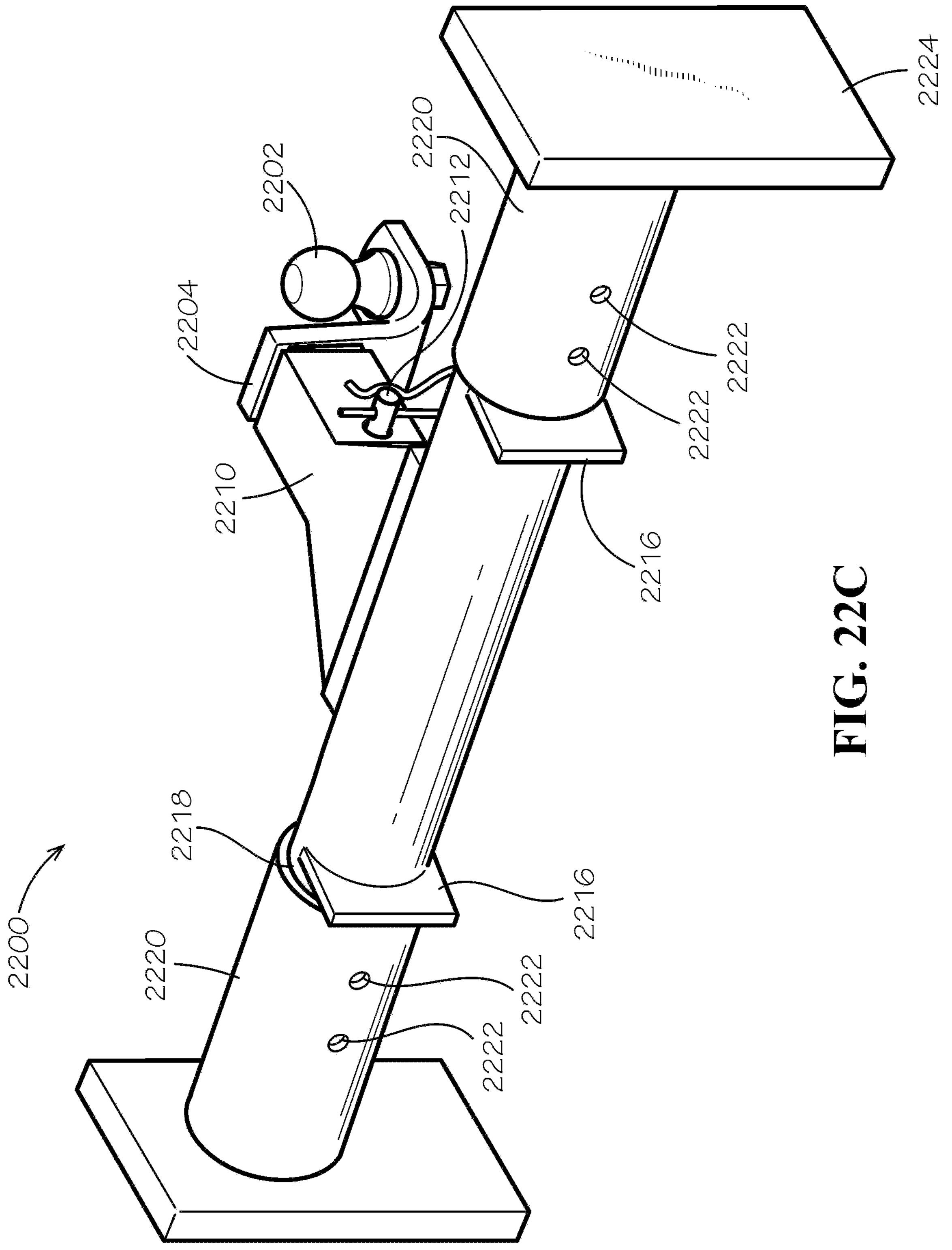
FIG. 22C is a perspective view depicting the trailer hitch adapter of FIG. 22A.

FIG. 22A, FIG. 22B, and FIG. 22C depict various views of one embodiment of a trailer hitch adapter 2200. The trailer hitch adapter 2200 may be operable to allow the mobile base 132 of the aerial work platform 130 to detachably couple to the trailer 150. As such, the mobile base 132 may tow the trailer 150 as the aerial work platform 130 moves during a painting job. The trailer hitch adapter 2200 may detachably mount to the hitch 1904 of the mobile base 132.

The trailer hitch adapter 2200 may include a ball hitch 2202. The ball hitch 2202 may be sized and shaped to detachably couple to a socket of a trailer coupler (e.g., the trailer coupler of the trailer 150). The trailer hitch adapter 2200 may include a ball mount 2204. The ball hitch 2202 may be disposed on the ball mount 2204. The trailer hitch adapter 2200 may include a fastener 2206. The fastener 2206 may detachably couple the ball hitch 2202 to the ball mount 2204. For example, as depicted FIG. 22A, the fastener 2206 may include a nut. The nut may screw onto a threaded member of the ball hitch 2202 that penetrates through an aperture of the ball mount 2204.

The ball mount 2204 may be disposed on a hitch extension member 2208. The hitch extension member 2208 may include a length of material that is insertable into an adapter base 2210 of the trailer hitch adapter 2200. The hitch extension member 2208 may telescope into the adapter base 2210 via an extension member aperture in the adapter base 2210. The adapter base 2210 may include a pin 2212. The pin 2212 may insert into one or more pin apertures in the adapter base 2210. The hitch extension member 2208 may include one or more pin apertures along its length. The pin 2212 may detachably insert into pin apertures of the adapter base 2210 and into pin apertures of the hitch extension member 2208. In this manner, the length of the hitch extension member 2208 may be adjustable. As depicted in FIG. 22B, the pin 2212 may include a pin fastener 2214, such as a hairpin fastener, that may be detachably inserted into the pin 2212 to prevent the pin 2212 from falling out of the pin apertures of the adapter base 2210

The trailer hitch adapter 2200 may include one or more base engagement members 2216. A base engagement member 2216 may be disposed on the adapter base 2210 and extend from the adapter base 2210 toward a side of the trailer hitch adapter 2200 that faces the mobile base 132. A base engagement member 2216 may engage with the mobile base 132 and provide a contact or support point between the trailer hitch adapter 2200 and the mobile base 132.

The trailer hitch adapter 2200 may include one or more adapter extension members 2218. An adapter extension member 2218 may include an extension member that extends away from the adapter base 2210. The adapter extension member 2218 may be coupled to the adapter base 2210 or, as is depicted in FIGS. 22A-C, may be integral with the adapter base 2210. The trailer hitch adapter 2200 may include one or more extenders 2220. An adapter extension member 2218 may insert into a extender 2220 in a telescoping manner. Each of the adapter extension members 2218 and extenders 2220 may include one or more pin apertures 2222. A pin (such as a pin that is similar to the pin 2212) may insert into the pin apertures 2222 and cause the length of the adapter extension member 2218 and extender 2220 to be adjustable.

The trailer hitch adapter 2220 may include one or more hitch flanges 2224. Each hitch flange 2224 may be disposed on an end of an extender 2220. A hitch flange 2224 may selectably engage with a portion of the hitch 1904 of the mobile base 132. The hitch flange 2224 engaging with the portion of the hitch 1904 may detachably couple the trailer hitch adapter 2200 to the mobile base 132.

Figure 23:
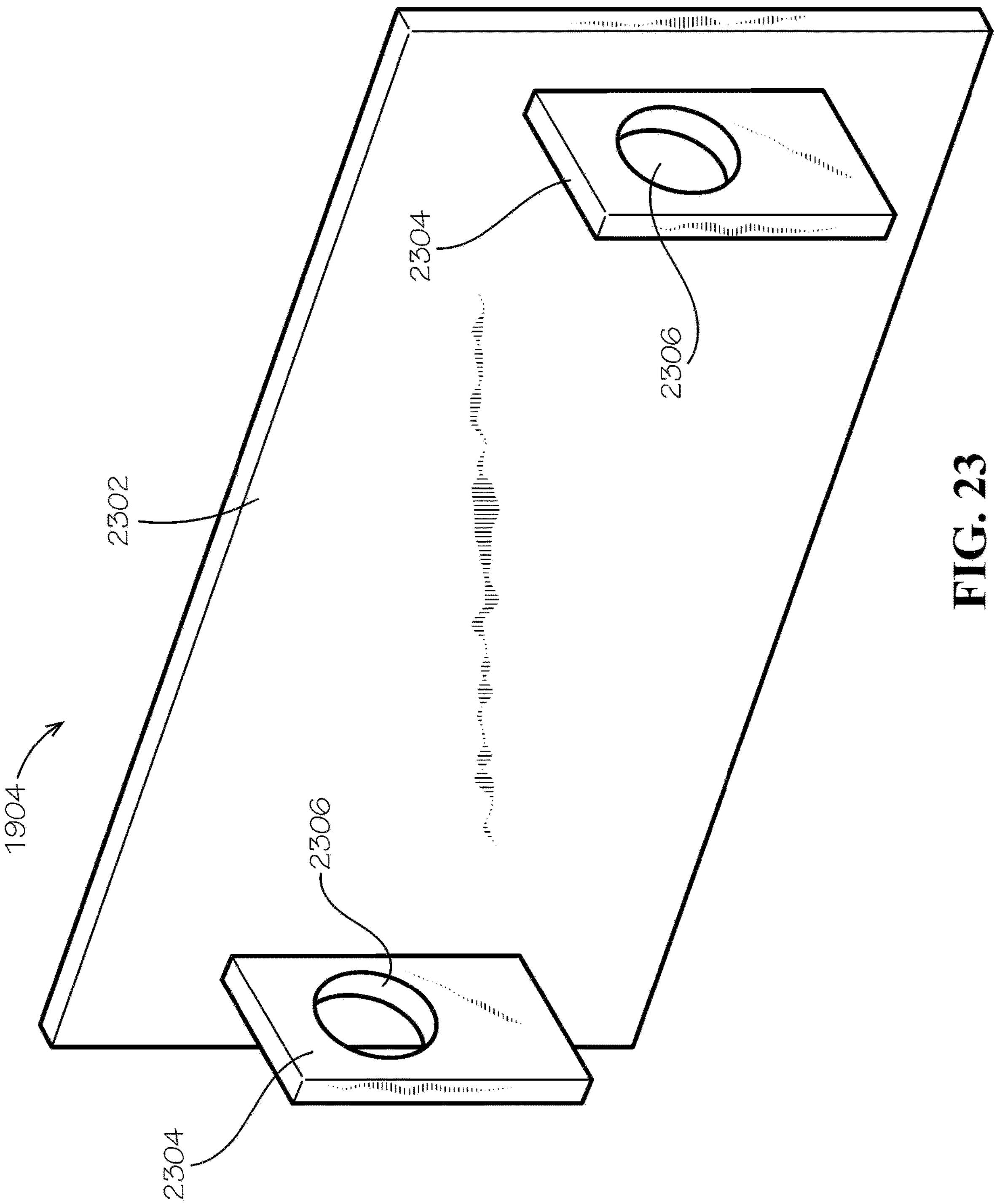
FIG. 23 is a perspective view depicting a hitch for the aerial work platform.

FIG. 23 depicts one embodiment of a hitch 1904. The hitch 1904 may include a hitch of the mobile base 132 of the aerial work platform 130. The hitch 1904 may include a plate 2302. The plate 2302 may be disposed on the mobile base 132. The plate 2302 may couple to the mobile base 132 or may be integral with the mobile base 132. The hitch 1904 may include one or more flanges 2304. A flange 2304 may be disposed on the plate 2302 and may extend away from the plate 2302. Each flange 2304 may include an aperture 2306. The aperture 2306 may be disposed on the flange 2304 in a variety of locations on the flange 2304.

Figure 24:
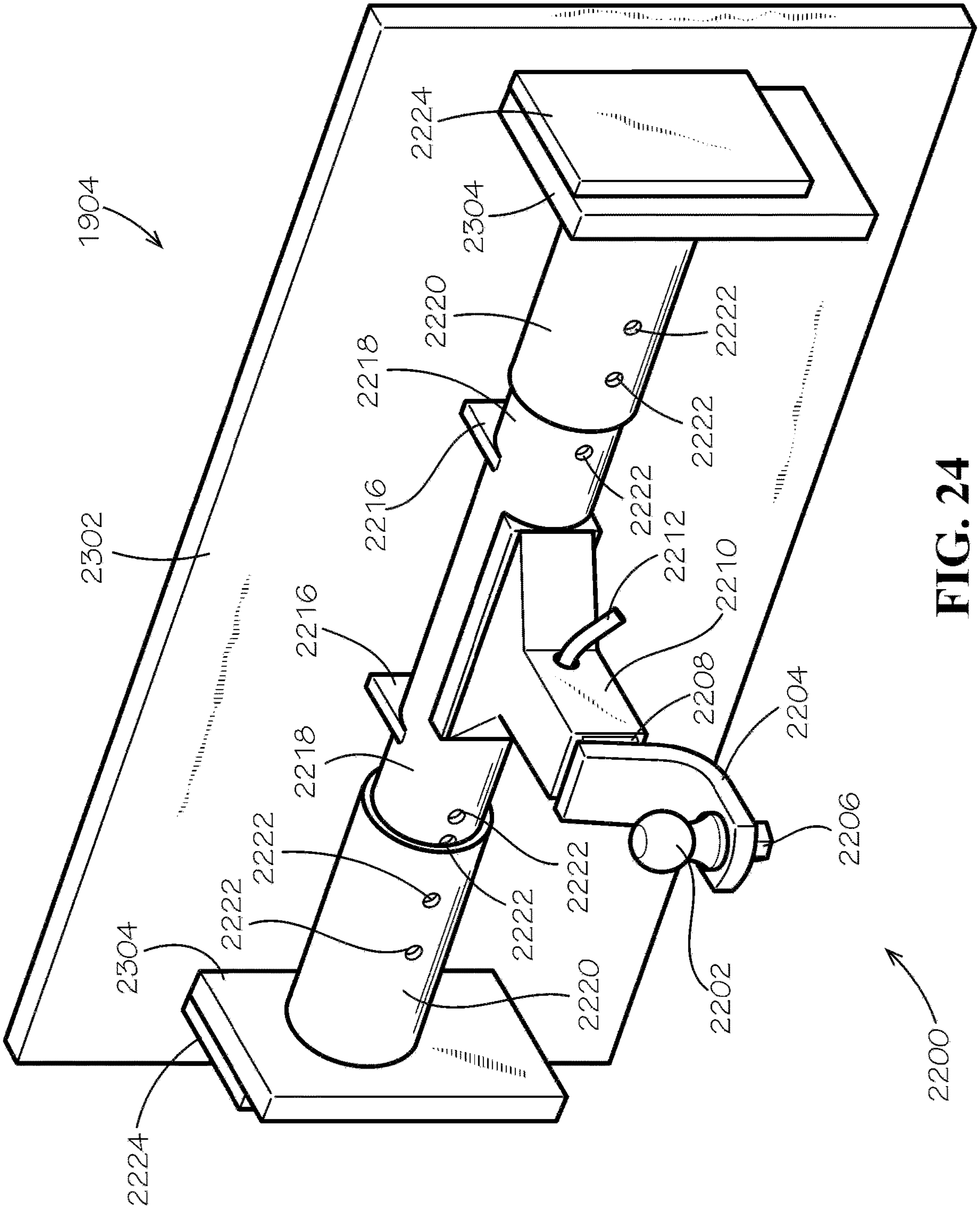
FIG. 24 is a perspective view depicting the trailer adapter of FIG. 22A disposed on the aerial work platform hitch of FIG. 23.

FIG. 24 depicts one embodiment of the trailer hitch adapter 2200 of FIGS. 22A-C engaged with the hitch 1904 of FIG. 23. The extenders 2220 may penetrate through the apertures 2306 of the flanges 2304 to detachably couple the trailer hitch adapter 2200 to the hitch 1904. As can be seen in FIG. 24, an extender 2220 may translate along a corresponding adapter extension member 2218 to adjust the length of the extender 2220 and adapter extension member 2218 or to adjust the position of the trailer hitch adapter 2200 relative to the hitch 1904.

In one example, selectively mounting the trailer hitch adapter 2200 to the hitch 1904 may include disengaging the extenders 2220 from the adapter extension members 2218. A user may position the adapter base 2210 (along with the adapter extension members 2218 disposed on the adapter base 2210) next to the plate 2302 in the desired position. The user may then slide the extenders 2220 through the apertures 2306 of the flanges 2304 and onto the adapter extension members 2218. The user may selectively dispose pins in the desired pin apertures 2222 to fasten the extenders 2220 to the adapter extension members 2218 at the desired length.

In some embodiments, the system 100 may be operated with only one operator. Once the paint sprayer array 110 is mounted on the basket 134 of the aerial work platform 130 and the trailer 150 is coupled to the mobile base 132 of the aerial work platform 130, the operator may position the paint sprayer array 110 for painting by using the controls of the aerial work platform 130. The paint sprayer array 110 may be provided with paint via the plurality of hoses 152 from the pump 154, which may receive the paint from the paint supply 156. In response to the plurality of sprayers 120 expelling paint in a desired spray pattern, the operator may operate the aerial work platform 130 to translate the paint sprayer array 110 relative to the work surface to be painted.

The operator may adjust certain characteristics of the system 100 in accordance with a job specification. For example, the array mount 116 can be placed at various positions on the array frame 112. The operator may modify the spacing between sprayers of the plurality of sprayers 120 or may adjust a nozzle 402, 502 of a sprayer 400, 500. The operator may swap out one component of the system 100 for another, such as a sprayer or the paint supply 154.

While the disclosure has discussed applying paint to a surface using the various systems and components disclosed herein, in some embodiments, the systems and components may be used to power wash a surface. In such embodiments, the paint supply 156 may not include paint but may include a power washing liquid such as water. The components of the system 100 may supply high-pressured water to the plurality of sprayers 120, which may expel the high-pressured water and power wash the surface.

This disclosure also relates to a method of painting a surface. The method may include: mounting the array mount 116 to the array frame 112 such that the array mount 116 is oriented toward the surface; securing the array frame 112 to the basket 134 of the aerial work platform 130; providing paint to the plurality of sprayers 120 via the plurality of hoses 152 and the pump 154; and adjusting the position of the plurality of sprayers 120 relative to the surface to provide paint coverage to the surface. The method may, likewise, include one or more steps described in different portions of this disclosure.

Thus, although there have been described particular embodiments of the present disclosure of a new and useful MODULAR PAINT SPRAYER SYSTEM, it is not intended that such references be construed as limitations upon the scope of this disclosure.

What is claimed is:

1. A system for repeatably applying paint to a surface comprising:
- a paint platform comprising:
  - an array frame;
  - a set of spray nozzles
    - arranged in a column and axially distributed along the array frame; and
  - a sprayer actuator:
    - interposed between the paint platform and the set of spray nozzles;
    - configured to support the set of spray nozzles over ranges of longitudinal and lateral positions; and
    - configured to raster the set of spray nozzles laterally to apply paint to the surface;
- a mobile platform comprising a lift, the lift configured to support and vertically move the paint platform on the mobile platform; and
- a controller configured to:
  - navigate the paint platform to a first segment of the surface;
  - trigger the sprayer actuator to activate the set of spray nozzles to apply paint over the first segment of the surface; and
  - trigger the mobile platform to navigate the paint platform to a second segment above the first segment of the surface.

2. The system of claim 1, wherein the paint platform comprises a shield assembly:
- coupled to the array frame;
- comprising a shield frame defining a set of apertures, each aperture in the set of apertures arranged about a corresponding spray nozzle in the set of spray nozzles;
- comprising a set of shielding members interposed between the set of apertures of the shield frame and the set of spray nozzles; and
- configured to prevent application of paint from the set of spray nozzles over the array frame.

3. The system of claim 2:
- wherein the paint platform comprises a paint roller assembly:
  - comprising a set of mounting members:
    - coupled to the shield assembly;
    - extending from the shield assembly toward the surface; and
    - configured to support a roller crossbar; and
  - comprising the roller crossbar rotatably engaged with the set of mounting members and rotatable about a roller crossbar axis; and
- wherein the controller is configured to activate the paint roller assembly to apply paint over the first segment of the surface via the roller crossbar.

4. The system of claim 3, wherein the paint roller assembly comprises a spring:
- engaged with a first mounting member in the set of mounting members; and
- configured to selectively compress and reduce damage to the paint sprayer array in response to the roller crossbar engaging with the first segment of the surface.

5. The system of claim 1, wherein the array frame comprises:
- a first support member characterized by a first length;
- a second support member arranged opposite the first support member and characterized by the first length;
- a first cross member spanning between the first support member and the second support member at a first position; and
- a second cross member spanning between the first support member and the second support member at a second position.

6. The system of claim 5, wherein the array frame comprises an array mount transiently coupled to the first support member and the second support member and configured to support the set of spray nozzles along the array frame.

7. The system of claim 1, wherein each spray nozzle in the set of spray nozzles comprises a solenoid control valve configured to trigger the spay nozzle to selectively apply paint to the surface in response to user interaction with the sprayer actuator.

8. The system of claim 1, wherein the sprayer actuator comprises a user interface comprising at least one of:
- a foot pedal;
- a lever;
- a button; or
- a dial.

9. The system of claim 1:
wherein the paint platform comprises a distance sensor:
mounted to the array frame and arranged to face the surface; and
configured to output a first signal corresponding to a distance between the set of spray nozzles and the surface; and
wherein the controller:
is configured to interpret a first distance between the set of spray nozzles and the surface based on the first signal; and
is configured to trigger the sprayer actuator to activate the set of spray nozzles to apply paint to the first segment of the surface in response to the first distance falling within a distance range.

10. The system of claim 9:
wherein the controller is configured to:
interpret a first distance value representing the first distance between the set of spray nozzles and the surface;
access a distance range corresponding to a performance value;
assign the performance value representing a probability of the set of spray nozzles applying paint to the surface in response to the first distance falling within the distance range; and
trigger a display to present the first distance value; and
wherein the distance sensor comprises a display:
configured to present the first distance value representing the first distance between the set of spray nozzles and the surface; and
comprising a distance indicator arranged on the display and configured to project a first color value from the display based on the performance value.

11. The system of claim 9, wherein the distance sensor comprises an ultrasonic sensor:
configured to emit an ultrasonic soundwave toward the first segment of the surface; and
configured to output the first signal corresponding to the distance between the set of spray nozzles and the first segment of the surface in response to a reflection of the ultrasonic soundwave from the surface.

12. The system of claim 1, wherein the array frame defines a set of visual indicators, each visual indicator in the set of visual indicators configured to constrain an orientation of each spray nozzle in the set of spray nozzles relative to the array frame.

13. The system of claim 1:
wherein the paint platform further comprises a sprayer activation assembly:
comprising the sprayer actuator; and
comprising a user interface; and
wherein the controller is configured to:
trigger the sprayer actuator to activate the set of spray nozzles to apply paint to the first segment of the surface in response to a first selection of a first activation level via the user interface; and
trigger the sprayer actuator to deactivate the set of spray nozzles in response to a second selection of a second activation level via the user interface.

14. The system of claim 13, wherein the controller is configured to trigger the mobile platform to vertically navigate the paint platform to the second segment above the first segment of the surface and to trigger the sprayer actuator to activate the set of spray nozzles to laterally apply paint over the second segment of the surface.

15. A system for repeatably applying paint to a surface comprising:
a paint platform comprising:
an array frame;
a set of spray nozzles arranged in a column and axially distributed along the array frame; and
a sprayer actuator:
interposed between the paint platform and the set of spray nozzles;
configured to support the set of spray nozzles over ranges of longitudinal and lateral positions; and
configured to raster the set of spray nozzles laterally to apply paint to the surface;
a mobile platform comprising a lift, the lift configured to support and vertically move the paint platform on the mobile platform;
a distance sensor:
mounted to the array frame and arranged to face the surface; and
configured to output a first signal corresponding to a distance between the set of spray nozzles and the surface; and
a controller configured to:
navigate the paint platform to a first segment of the surface;
interpret a first distance between the set of spray nozzles and the first segment of the surface based on the first signal; and
trigger the sprayer actuator to activate the set of spray nozzles to apply paint over the first segment of the surface in response to the first distance falling within a distance range.

16. The system of claim 15:
wherein the controller is configured to:
interpret a first distance value representing the first distance between the set of spray nozzles and the surface;
access a distance range corresponding to a performance value;
assign the performance value representing a probability of paint application on the surface via the set of spray nozzles in response to the first distance falling within the distance range; and
trigger a display to present the first distance value; and
wherein the distance sensor comprises a display:
configured to present the first distance value representing the first distance between the set of spray nozzles and the surface; and
comprising a distance indicator arranged on the display and configured to project a first color value from the display based on the performance value.

17. The system of claim 15:
wherein the distance sensor is configured to output a second signal corresponding to the distance between the set of spray nozzles and the surface;
wherein the controller is configured to:
interpret a second distance greater than the first distance between the set of spray nozzles and the surface based on the second signal;
interpret a second distance value representing the second distance between the set of spray nozzles and the surface;
access a distance range corresponding to a performance value;

assign the performance value representing a probability of absence of paint application on the surface via the set of spray nozzles in response to the first distance falling outside the distance range; and trigger a display to present the second distance value; and wherein the distance sensor comprises a display:

configured to present the second distance value representing the second distance between the set of spray nozzles and the surface; and comprising a distance indicator arranged on the display and configured to project a first color value from the display based on the performance value.

18. The system of claim 15:

wherein the paint platform comprises a set of sprayer mounts:

coupled to the array frame; and configured to support the set of spray nozzles over ranges of longitudinal and lateral positions relative to the surface; and wherein each spray nozzle in the set of spray nozzles is coupled to a corresponding sprayer mount, in the set of sprayer mounts.

19. A system for repeatably applying paint to a surface comprising:

a paint platform comprising:

a frame;

a set of sprayer mounts:

coupled to the frame; and configured to support a set of spray nozzles over ranges of longitudinal and lateral positions relative to the surface;

the set of spray nozzles arranged in a column and coupled to a corresponding sprayer mount in the set of sprayer mounts; and a sprayer actuator:

coupled to the paint platform; and configured to raster the set of spray nozzles laterally to apply paint to the surface;

a mobile platform comprising a lift, the lift configured to support and vertically move the paint platform on the mobile platform;

a distance sensor:

mounted to the frame and arranged to face the surface; and configured to output a first signal corresponding to a distance between the set of spray nozzles and the surface; and a controller configured to:

navigate the paint platform to a first segment of the surface; and interpret a first distance between the set of spray nozzles and the first segment of the surface based on the first signal;

trigger the sprayer actuator to activate the set of spray nozzles to apply paint over the first segment of the surface in response to the first distance falling within a distance range; and trigger the mobile platform to navigate the paint platform to a second segment above the first segment of the surface.

20. The system of claim 19, wherein the controller is further configured to trigger the mobile platform to vertically navigate the paint platform to the second segment above the first segment of the surface and to trigger the sprayer actuator to activate the set of spray nozzles to laterally apply paint over the second segment of the surface.

* * * * *